(12) United States Patent
Yoffe et al.

(10) Patent No.: US 11,989,963 B2
(45) Date of Patent: May 21, 2024

(54) ARTIFICIAL INTELLIGENCE ASSISTED SPEECH AND IMAGE ANALYSIS IN TECHNICAL SUPPORT OPERATIONS

(71) Applicant: TECHSEE AUGMENTED VISION LTD., Herzliya (IL)

(72) Inventors: Amir Yoffe, Tel-Mond (IL); Eitan Cohen, Tel Aviv (IL)

(73) Assignee: TechSee Augmented Vision, Ltd., Herzliya (IL)

( * ) Notice: Subject to any disclaimer, the term of this patent is extended or adjusted under 35 U.S.C. 154(b) by 351 days.

(21) Appl. No.: 17/566,528

(22) Filed: Dec. 30, 2021

(65) Prior Publication Data

US 2022/0208188 A1 Jun. 30, 2022

Related U.S. Application Data

(60) Provisional application No. 63/131,875, filed on Dec. 30, 2020.

(51) Int. Cl.
*G10L 15/22* (2006.01)
*G06F 40/30* (2020.01)
(Continued)

(52) U.S. Cl.
CPC ............ *G06V 30/153* (2022.01); *G06F 40/30* (2020.01); *G06Q 30/012* (2013.01);
(Continued)

(58) Field of Classification Search
CPC ...... G06V 30/153; G06V 10/12; G06V 30/10; G06V 30/147; G06V 30/242; G06V 10/26;
(Continued)

(56) References Cited

U.S. PATENT DOCUMENTS 9,864,949 B1 1/2018 Astigarraga et al.
10,410,428 B1 9/2019 Reeder et al.
(Continued)

OTHER PUBLICATIONS

International Search Report dated May 11, 2022, in corresponding International Application No. PCT/IB2021/062505.
(Continued)

*Primary Examiner* — Abul K Azad
(74) *Attorney, Agent, or Firm* — FINNEGAN, HENDERSON, FARABOW, GARRETT & DUNNER LLP

(57) ABSTRACT

A non-transitory computer readable medium includes instructions that, when executed by at least one processor, cause the at least one processor to perform artificial-intelligence-based technical support operations. The operations may include receiving over at least one network first audio signals including speech data associated with a technical support session and first image signals including image data associated with a product for which support is sought from a mobile communications device, analyzing the first audio signals and the first image signals using artificial intelligence, aggregating the analysis thereof, accessing at least one data structure to identify an image capture instruction, presenting the image capture instruction including a direction to alter and capture second image signals of a structure identified in the first image signals to the mobile communications device, receiving from the mobile communications device second image signals, analyzing the same using artificial intelligence, and determining a technical support resolution status.

27 Claims, 16 Drawing Sheets

(51) Int. Cl.
*G06Q 30/012* (2023.01)
*G06T 7/00* (2017.01)
*G06V 10/12* (2022.01)
*G06V 30/10* (2022.01)
*G06V 30/146* (2022.01)
*G06V 30/148* (2022.01)
*G06V 30/242* (2022.01)
*G10L 13/02* (2013.01)
*G10L 15/18* (2013.01)
*G06F 40/35* (2020.01)
*G06V 10/26* (2022.01)
*G06V 10/44* (2022.01)
*G06V 10/80* (2022.01)
*G06V 20/20* (2022.01)
*G10L 15/26* (2006.01)

(52) U.S. Cl.
CPC ............ *G06T 7/0006* (2013.01); *G06V 10/12* (2022.01); *G06V 30/10* (2022.01); *G06V 30/147* (2022.01); *G06V 30/242* (2022.01); *G10L 13/02* (2013.01); *G10L 15/1815* (2013.01); *G10L 15/22* (2013.01); *G06F 40/35* (2020.01); *G06T 2207/30176* (2013.01); *G06V 10/26* (2022.01); *G06V 10/44* (2022.01); *G06V 10/803* (2022.01); *G06V 20/20* (2022.01); *G10L 2015/223* (2013.01); *G10L 15/26* (2013.01)

(58) Field of Classification Search
CPC ...... G06V 10/44; G06V 10/803; G06V 20/20; G06F 40/30; G06F 40/35; G06Q 30/012; G06T 7/0006; G06T 2207/30176; G10L 13/02; G10L 15/1815; G10L 15/22; G10L 15/26; G10L 2015/223
See application file for complete search history.

(56) References Cited

U.S. PATENT DOCUMENTS

| | | | |
|---|---|---|---|
| 10,901,834 B2 * | 1/2021 | Abhinav | ................ G06V 20/20 |
| 2009/0287534 A1 | 11/2009 | Guo et al. | |
| 2018/0302284 A1 * | 10/2018 | Roman | ............... H04L 41/0806 |
| 2020/0126445 A1 | 4/2020 | Tan et al. | |
| 2020/0160351 A1 * | 5/2020 | Veggalam | ........... H04M 3/5233 |
| 2020/0404100 A1 * | 12/2020 | Amir | .................... H04L 65/401 |
| 2021/0320999 A1 * | 10/2021 | Johnson | ............. H04M 3/5191 |

OTHER PUBLICATIONS

International Preliminary Report on Patentability dated Jul. 4, 2023, in corresponding International Application No. PCT/IB2021/062505.

* cited by examiner

ARTIFICIAL INTELLIGENCE ASSISTED SPEECH AND IMAGE ANALYSIS IN TECHNICAL SUPPORT OPERATIONS

CROSS-REFERENCE TO RELATED APPLICATION

This application claims the benefit of U.S. Provisional Patent Application No. 63/131,875, filed Dec. 30, 2020, which is incorporated by reference herein in its entirety.

TECHNOLOGICAL FIELD

Embodiments of the present disclosure relate generally to the field of artificial-intelligence-based technical support operations. More particularly, embodiments of the present disclosure relate to systems, methods, and non-transitory computer readable medium capable of performing artificial-intelligence-based technical support operations to assist a user with technical support.

BACKGROUND

Technical support systems utilized nowadays make it difficult for digital service providers (DSPs), and especially for service/technical support centers, to provide efficient, in terms of time and customer satisfaction, technical support services to their customers. Despite a recent push toward self-service schemes, customers have been slow to adopt self-service technologies. Today's customers support models and relevant technologies are subject to the numerous challenges, including increasingly complex customer needs, communication gaps, diagnosis challenges, limited problem solving rates, and customer dissatisfaction and frustration.

Some of the techniques disclosed herein aim to provide remote efficient consumer support services and reduce the incidence of technician dispatch. These techniques are useful for shortening consumer wait time, improving installation and repair outcomes, and improving customer satisfaction and independence.

SUMMARY

Embodiments consistent with the present disclosure provide systems and methods capable of performing artificial-intelligence-based technical support operations, such as speech and/or image analysis during a service session, to assist a user with technical support. The disclosed systems and methods may be implemented using a combination of conventional hardware and software as well as specialized hardware and software, such as a machine constructed and/or programmed specifically for performing functions associated with the disclosed embodiments. Consistent with other disclosed embodiments, non-transitory computer readable media may store program instructions, which are executed by at least one processing device and may perform any of the steps and/or methods described herein.

According to one aspect of the present disclosure, the disclosed embodiments may relate to systems, methods, and non-transitory computer readable medium for performing artificial-intelligence-based technical support operations. By way of example only, the operations may include receiving over at least one network first audio signals from a mobile communications device, the first audio signals including speech data associated with a technical support session; receiving first image signals from the mobile communications device via the at least one network, the first image signals including image data associated with a product for which support is sought; analyzing the first audio signals using artificial intelligence; analyzing the first image signals using artificial intelligence; aggregating the analysis of the first audio signals and the first image signals; based on the aggregated analysis of the first image signals and the first audio signals, accessing at least one data structure to identify an image capture instruction; presenting the image capture instruction to the mobile communications device via the at least one network, the image capture instruction including a direction to alter a physical structure identified in the first image signals and to capture second image signals of an altered physical structure; receiving from the mobile communications device second image signals via the at least one network, the second image signals corresponding to the altered physical structure; analyzing the captured second image signals using artificial intelligence; and based on the analysis of the second image signals, determining a technical support resolution status.

The foregoing general description provides only a few examples of the disclosed embodiments and is not intended to summarize all aspects of the disclosed embodiments. Moreover, the following detailed description is exemplary and explanatory only and is not restrictive of the claims.

BRIEF DESCRIPTION OF THE DRAWINGS

In order to better understand various aspects of the present disclosure and to see how they may be carried out in practice, certain embodiments will now be described, by way of non-limiting examples only, with reference to the accompanying drawings. Features shown in the drawings, which are incorporated in and constitute a part of this disclosure, are meant to be illustrative of only some embodiments of aspects of the invention, unless otherwise implicitly indicated. In the drawings like reference numerals are used to indicate corresponding parts.

DETAILED DESCRIPTION

Figure 1A:
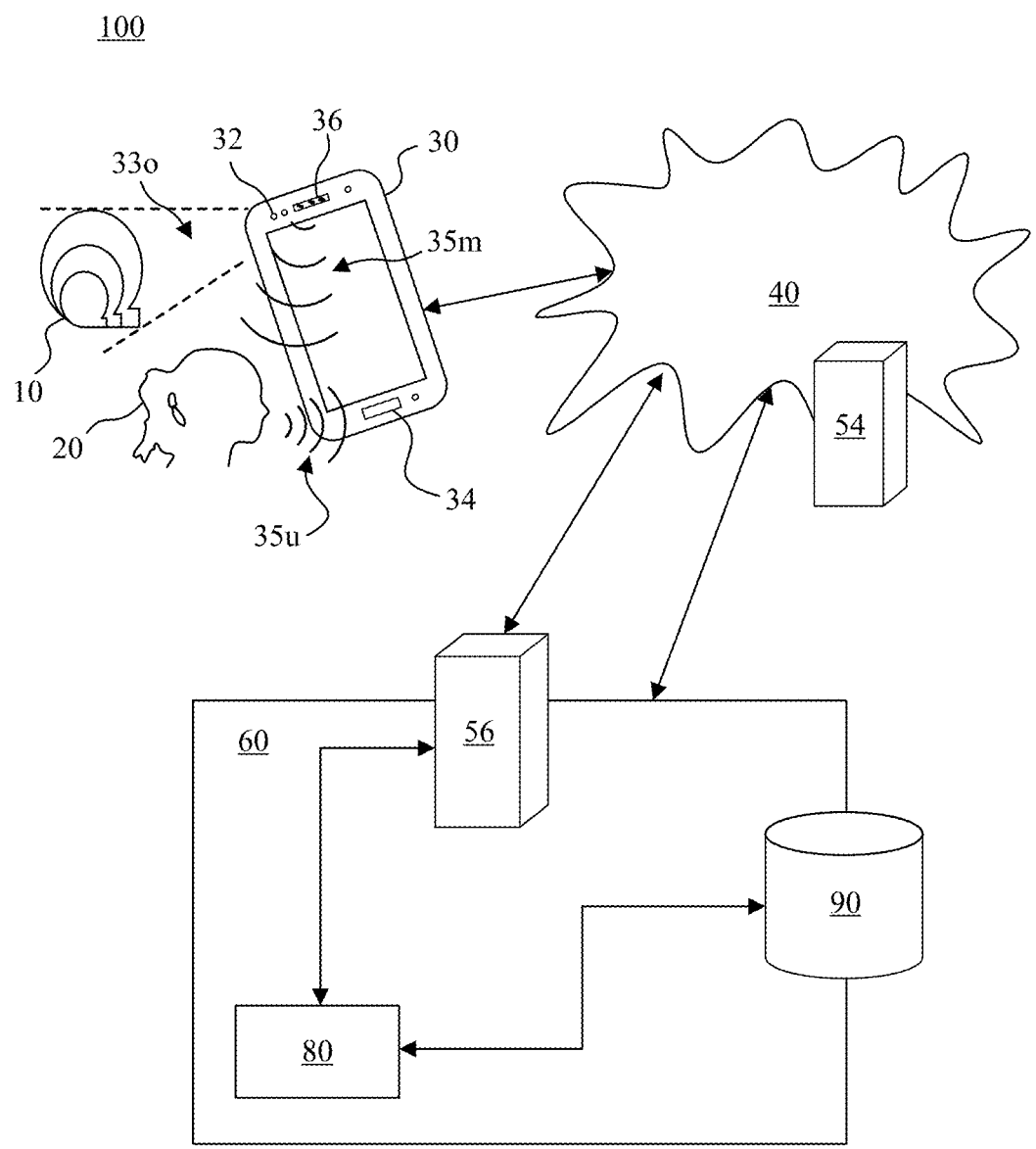
FIG. 1A is a simplified network diagram illustrating exemplary communications between a remote user and a technical support center via at least one network during an artificial-intelligence-based technical support session, consistent with at least one embodiment of the present disclosure.

The following detailed description provides various non-limiting embodiments, or examples, for implementing different features of the provided subject matter and refers to the accompanying drawings, which are to be considered in all aspects as illustrative only and not restrictive in any manner. Wherever possible, the same reference numerals are used in the drawings and the following description to refer to the same or similar parts. This repetition is for the purpose of simplicity and clarity and does not in itself dictate a relationship between the various embodiments discussed. While several illustrative embodiments are described herein, modifications, adaptations and other implementations are possible. For example, substitutions, additions, and/or modifications may be made to the components illustrated in the drawings, and the illustrative methods described herein may be modified by substituting, reordering, removing, and/or adding steps to the disclosed methods. Moreover, in certain instances, well-known or conventional details may not be described in order to provide a more concise discussion of the embodiments. Accordingly, the following detailed description is not limited to the disclosed embodiments and examples. Instead, the proper scope is to be defined by the claims.

Aspects of this disclosure relate to automated remote assistance. By way of an exemplary introduction with reference to FIG. 1A, a user 20 having technical difficulties at home or in the office, may contact a remote technical support center 60 via the user's mobile communications device 30 (e.g., cell phone). The user 20 may communicate orally through speech (input sound signals 35*u*) using the cell phone's microphone (audio sensor 34) to explain the difficulties and may capture and transmit images of the defective equipment (object 10) using the cell phone's camera (image sensor 32). The audio and image signals may be transmitted over a network, such as a cellular network 40 to a control unit 80 in the technical support center 60. The control unit 80, may be connected to a data structure 90 and a server 56. The control unit 80, accesses information within data structure 90 to interpret the image and audio signals received from the user and to communicate with the user in a way that assists the user in resolving the technical difficulties. The interpretation by the control unit and subsequent interactions with the user may occur via artificial intelligence as described herein.

Some aspects of the present disclosure provide remote assistance techniques for identifying technical problems, defects, and improper equipment configurations, and determining a most likely solution to resolve them. More specifically, aspects of the present disclosure relate to methods, systems, and/or non-transitory computer readable medium capable of performing artificial-intelligence-based technical support operations. Various embodiments may be described with reference to a system, method, device, and/or computer readable medium. It is intended that the disclosure of one is a disclosure of all. For example, it is to be understood that the disclosure of a computer readable medium, as described herein, may also constitute a disclosure of methods implemented by the computer readable medium, as well as systems and/or devices for implementing those methods, for example, via at least one processor. Moreover, features of the presently disclosed subject matter are, for brevity, described in the context of particular embodiments. However, it is to be understood that this form of disclosure is for ease of discussion only, and one or more aspects of one embodiment disclosed herein may also be combined with one or more aspects of other embodiments disclosed herein, within the intended scope of this disclosure. Likewise, features and/or steps described in the context of a specific combination may be considered as separate embodiments, either alone or in a context other than the specific combination disclosed.

Aspects of the disclosure may include a non-transitory computer readable medium including instructions that, when executed by at least one processor, cause the at least one processor to perform certain operations, for example, artificial-intelligence-based technical support operations. As used herein, the term "non-transitory computer readable medium" should be expansively construed to cover any medium capable of storing data in any memory in a way that may be read by any computing device having at least one processor to carry out operations, methods, or any other instructions stored in the memory. Such instructions, when executed by at least one processor, may cause the at least one processor to carry out a method for performing one or more features or methods of the disclosed embodiments.

The non-transitory computer readable medium may, for example, be implemented as hardware, firmware, software, or any combination thereof. The software may preferably be implemented as an application program tangibly embodied on a program storage unit or computer readable medium consisting of parts, or of certain devices and/or a combination of devices. The application program may be uploaded to, and executed by, a machine including any suitable architecture. For example, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. A non-transitory computer readable medium may be any computer readable medium except for a transitory propagating signal.

Moreover, the term "computer readable medium" may refer to multiple structures, such as a plurality of computer readable mediums and/or memory devices. A memory device may include a Random Access Memory (RAM), a Read-Only Memory (ROM), a hard disk, an optical disk, a magnetic medium, a flash memory, other permanent, fixed, volatile or non-volatile memory, or any other mechanism capable of storing instructions. The memory device may include one or more separate storage devices collocated or disbursed, capable of storing data structures, instructions, or any other data. The memory device may further include a memory portion containing instructions for the processor to execute. The memory device may also be used as a working scratch pad for the processors or as a temporary storage.

Some embodiments may relate to at least one processor. The term "processor" may refer to any physical device or group of devices having electric circuitry that performs a logic operation on input or inputs. For example, the at least one processor may include one or more integrated circuits (IC), including an application-specific integrated circuit (ASIC), microchips, microcontrollers, microprocessors, all or part of a central processing unit (CPU), a graphics processing unit (GPU), a digital signal processor (DSP), a field-programmable gate array (FPGA), a central processing unit (CPA), a visual processing unit (VPU), an image signal processor (ISR),server, virtual server, or any other circuits suitable for executing instructions or performing logic operations. The instructions executed by at least one processor may, for example, be pre-loaded into a memory integrated with or embedded into a controller or may be stored in a separate memory. Moreover, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by any other means that permit them to interact.

As used throughout this disclosure, the terms "processor," "computer," "controller," "control unit," "processing unit," "computing unit," and/or "processing module" should be expansively construed to cover any kind of electronic device, component, or unit with data processing capabilities, including, by way of a non-limiting example, a personal computer, a wearable computer, a tablet, a smartphone, a server, a computing system, a cloud computing platform, a communication device, a processor, possibly with embedded memory, a single core processor, a multi core processor, a core within a processor, any other electronic computing device, or any combination of the above. The operations, in accordance with the teachings disclosed herein, may be performed by a computer specially constructed or programmed to perform the described functions.

In the disclosed embodiments, the instructions included on a non-transitory computer readable medium, when executed by the at least one processor, may cause the at least one processor to perform artificial-intelligence-based technical support operations. Artificial-intelligence-based technical support operations, as used herein, may relate to a plurality of operations in which a processing system having at least one processor is configured to utilize artificial intelligence during a technical support session. While artificial intelligence may be utilized during certain technical support operations of the technical support session, it is to be understood that some technical support operations may be executed with or without the use of artificial intelligence.

As used herein, the term "technical support" may refer to any remote assistance techniques for identifying technical problems, non-technical problems, installation issues, defects, and/or improper equipment configurations; determining a most likely solution to resolve them; determining the extent to which the technical problem, non-technical problem, installation issue, defect, or improper equipment configuration has been remediated; and/or providing guidance on issues that were not resolved during a support session. Technical support may relate to a wide range of services which may be provided to remote users for any type of product. Technical support, as used herein, is not limited to support pertaining to troubleshooting issues with electronic products such as computers, mobile phones, printers, and electronic, mechanical or electromechanical systems and devices, as well as software which may be utilizable therewith, and may relate to any service session in which a remote user obtains support with respect to any object of interest, including industrial goods, consumer goods, or any other article or substance that is manufactured or refined for sale, which may require customer support. Additionally, technical support may be provided by a technical support center and may utilize a remote customer service agent, artificial intelligence, for example an automated customer service assistant, and/or a combination thereof. It is to be understood that a technical support center, as utilized herein, is not limited to a single support center, and may encompass multiple support centers in different geographic locations, or a plurality of disbursed individuals (e.g., working from home).

As used herein, the term "artificial intelligence" may refer, for example, to the simulation of human intelligence in machines or processors that exhibit traits associated with a human mind such as learning and problem-solving. Artificial intelligence, machine learning, deep learning, or neural network processing techniques may enable the automatic learning through absorption of huge amounts of unstructured data such as text, audio, images, or videos and user preferences analyzed over a period of time such as through statistical computation and analysis. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and/or any other algorithm in which a machine or processor takes inputs and outputs simultaneously in order to "learn" the data and produce outputs when given new inputs. As used herein, artificial intelligence may relate to machine learning algorithms, also referred to as machine learning models, which may be trained using training examples, for example in the cases described below involving image recognition and processing and speech recognition and processing.

A trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples training machine learning algorithms using the training examples may generate a trained machine learning algorithm, and the trained machine learning algorithm may be used to estimate outputs for inputs not included in the training examples. In some examples, engineers, scientists, processes, and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

In the disclosed embodiments, the term "artificial-intelligence-based technical support" may relate to any remote support techniques and/or operations which may be provided by way of a technical support center utilizing artificial intelligence to resolve an issue or issues with any object of interest at, for example, a remote user's home, office, or any other remote site. As disclosed herein, artificial-intelligence-based technical support may relate to operations performed by a non-transitory computer readable medium. The operations performed by a non-transitory computer readable medium may relate to a plurality of simultaneous artificial-intelligence-based technical support sessions with a plurality of users. The techniques and/or operations disclosed herein may also be used in interactive applications to assist with the installation and/or troubleshooting of various objects of interest, including, furniture, consumer electronics, appliances, and other products, which may require customer support. It is to be understood that the algorithms and analytics disclosed herein may establish a self-service mechanism in which human support from the technical support center is not required during the artificial-intelligence-based technical support session.

Turning to the figures, FIG. 1A depicts a simplified network diagram illustrating exemplary communications between a remote user 20 utilizing a mobile communications device 30 and a technical support center (TSC) 60 via at least one network 40 during an artificial-intelligence-based technical support session 100, consistent with at least one embodiment of the present disclosure. The remote user 20 may send and/or receive information during the artificial-intelligence-based technical support session 100 to and/or from the TSC 60 with respect to an object of interest 10. For example, the user's mobile communications device 30 may be configured to receive input sound signals 35$u$ and input optical signals 33$o$ corresponding to the object of interest 10 and/or elements thereof and transmit data corresponding to said input signals to a control unit 80 of the TSC 60 via at least one network 40.

The control unit 80, may be connected to a data structure 90 and at least one server and may be configured to access information within a data structure 90 to interpret the speech and audio signals received from the user and to communicate with the user 20 in a way that assists the user in resolving technical difficulties. The at least one server may be implemented as part of the TSC 60, such as remote server 56, and/or in a cloud computing infrastructure, such as remote server 54, accessible to both the remote user 20 and/or the TSC 60. In some embodiments, operations of the artificial-intelligence-based technical support session 100 may relate to instructions included on a non-transitory computer readable medium which may be executed by at least one processor of the data structure 90.

Figure 1B:
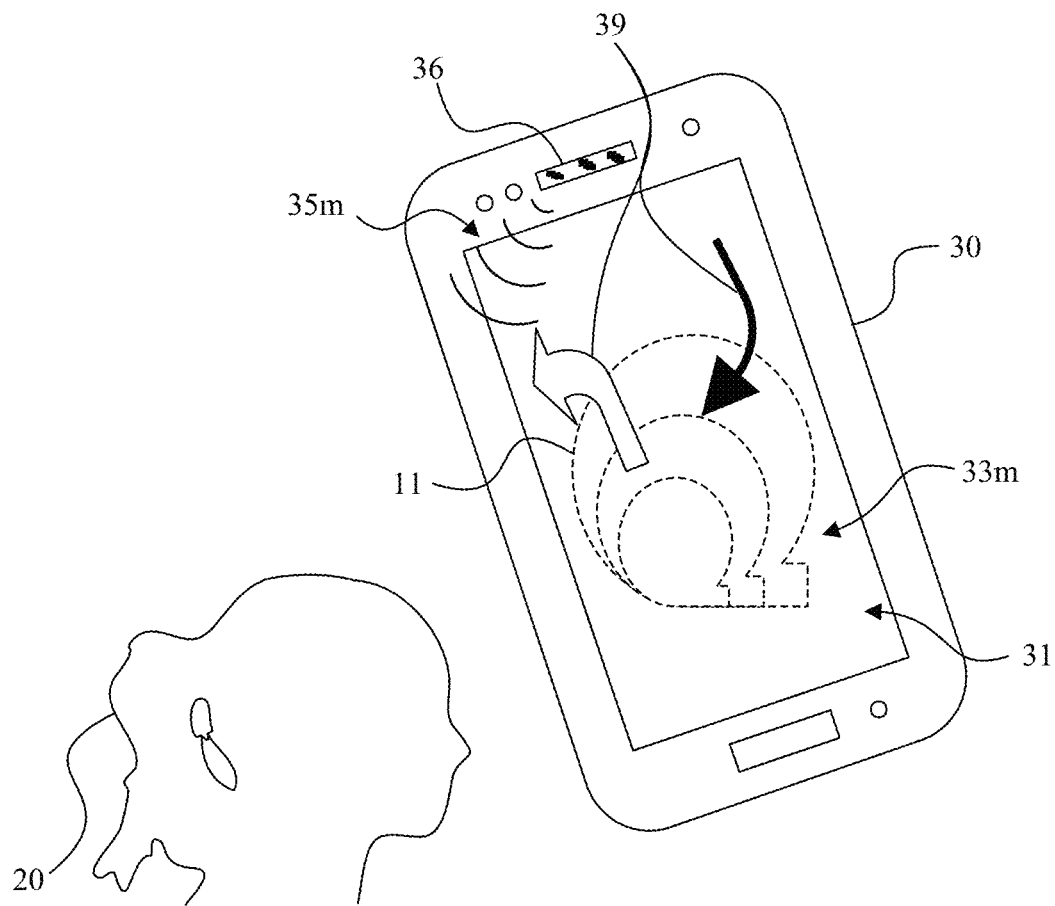
FIG. 1B illustrates certain communication aspects from the perspective of the remote user illustrated in FIG. 1A, consistent with at least one embodiment of the present disclosure.

FIG. 1B illustrates certain communication aspects of the artificial-intelligence-based technical support session 100 from the perspective of the remote user 20 illustrated in FIG. 1A. During the artificial-intelligence-based technical support session 100, the remote user 20 may receive information from the control unit 80 of the TSC 60 pertaining to an object of interest 10. For example, the user's mobile communications device 30 may be configured to receive information pertaining to technical support from the control unit 80 of the TSC 60 via at least one network 40. The information received from the TSC 60 may be communicated to the user 20 auditorily (output sound signals 35$m$) via a speaker unit 36 of the mobile communications device 30 and/or visually (output image signals 33$m$) via a display unit 31 of the mobile communications device 30 in a way that assists the user in resolving technical difficulties. In some embodiments, the output image signals 33$m$ corresponding to the object of interest 10 may appear on the display unit 31 as an annotated object 11 which may include annotations/markers 39 superimposed onto said annotated object 11. Details pertaining to the various components of the artificial-intelligence-based technical support session 100, as depicted in FIGS. 1A-1B, will be discussed in greater detail below.

In certain embodiments, the TSC may be configured to simultaneously engage in a plurality of support sessions including the support session with the mobile communications device and support sessions with a plurality of additional mobile communications devices. For example, a non-transitory computer readable medium may be configured to simultaneously engage in a plurality of artificial-intelligence-based technical support sessions including the support session 100 with the mobile communications device 30 and multiple additional support sessions, akin to support session 100, with a plurality of additional mobile communications devices akin to mobile communication device 30.

In some embodiments, the artificial-intelligence-based technical support operations may be performed in an automated fashion without human intervention. Technical support conducted in an automated fashion without human intervention may enable a user seeking technical support to conduct a self-service support session in which technical support is provided in a fully automated process. For example, during the artificial-intelligence-based technical support session 100, the control unit 80 of the TSC 60 may be configured to perform certain technical support operations in an automated fashion without intervention from a live customer service agent of the TSC 60.

Figure 2:
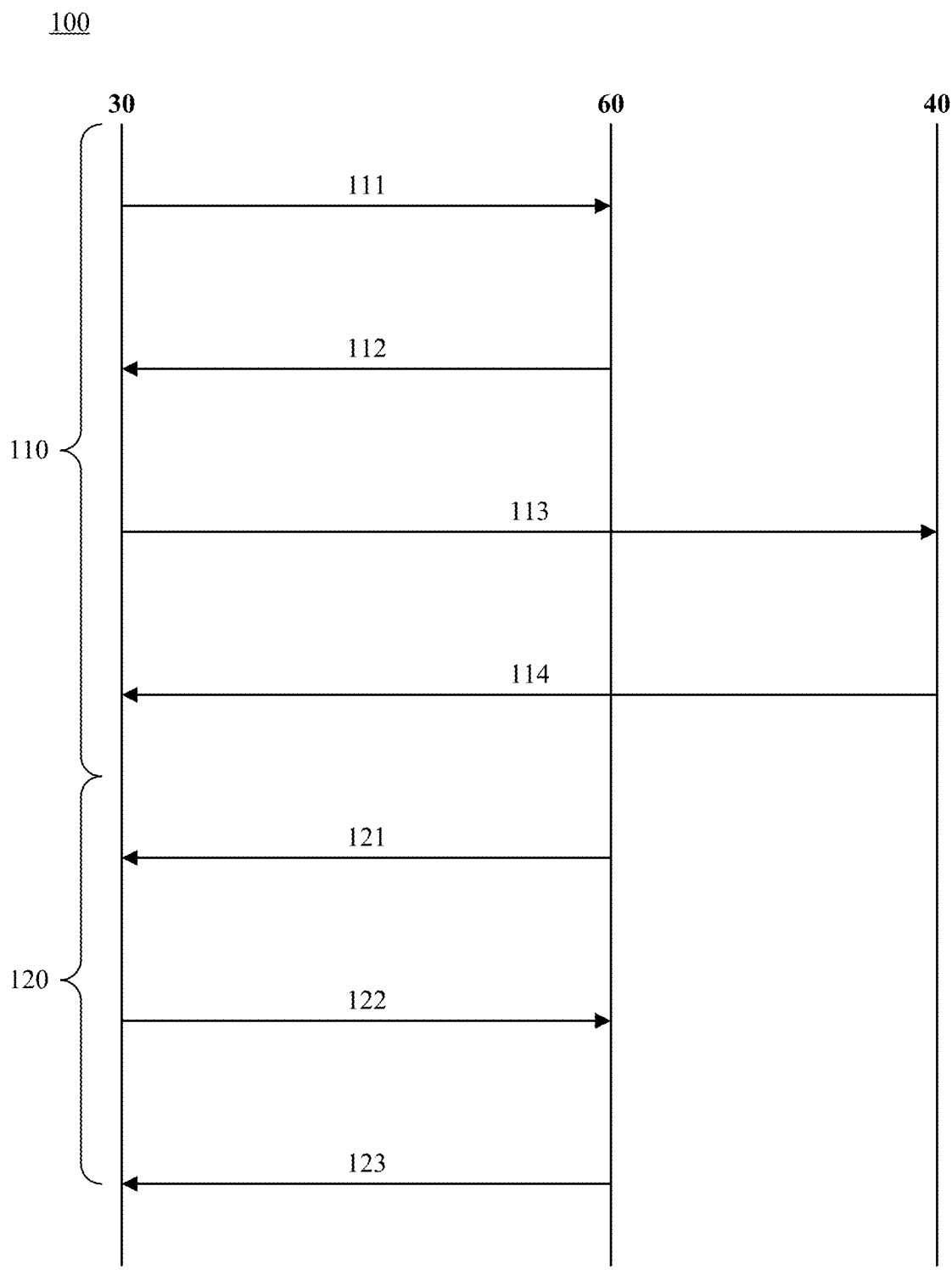
FIG. 2 is a sequence diagram illustrating possible stages in the communication establishment process of an artificial-intelligence-based technical support session, consistent with at least one embodiment of the present disclosure.

FIG. 2 illustrates a sequence diagram depicting possible stages in a technical support session initiation process 110 and an activation process 120 of the artificial-intelligence-based technical support session 100 between the mobile communications device 30 and the TSC 60 via at least one network 40 according to one non-limiting embodiment of the present disclosure. The technical support session initiation process 110 of the artificial-intelligence-based technical support session 100 may commence when a remote user calls or otherwise contacts the TSC 60 using a mobile communications device 30. At Step 111 of the technical support session initiation process 110, connection initiation may be performed over a cellular and/or landline network, or other communication channels such as satellite communication, voice over IP, or any type of physical or wireless computer networking arrangement used to exchange data.

When a connection is established between the user's mobile communications device 30 and the TSC 60, at Step 112, the TSC 60 may send an activation link, or other means for establishing communication with the TSC 60, to the mobile communications device 30. For example, an activation link may be embedded in a message, such as SMS, email, WhatsApp, or any other means for establishing communication and may contain a hyperlink, such as a URL, sent from the TSC 60 to initiate the artificial-intelligence-based technical support session 100. Upon accessing the activation link, at Step 113, the mobile communications device 30 may establish communication with the TSC 60 via at least one network 40. In some embodiments, establishing communication may be achieved by means of an application installed on the mobile communications device 30. Once connection between the user's mobile communications device 30 and the TSC 60 is established via the at least one network 40, technical support session setup instructions/code may be sent to the mobile communications device 30 at Step 114.

Once the technical support session setup code is entered and/or instructions are followed, the activation process 120 of the artificial-intelligence-based technical support session 100 may begin. At Step 121 of the activation process 120, the TSC 60 may request the remote user's permission to access and/or activate an image sensor 32, such as a camera, and/or an audio sensor 34, such as a microphone, of the mobile communications device 30. Once the remote user approves the activation request, at Step 122, the image sensor 32 and/or the audio sensor 34 may be activated at Step 123 thereby enabling the TSC 60 to request that the remote user direct the image sensor 32 toward the object of interest 10 for which support is sought and/or describe information pertaining to the object of interest 10 into the audio sensor 34. Upon obtaining access to the image sensor 32 and/or audio sensor 34, and corresponding image data and/or audio data, the TSC 60 may simultaneously receive image data and/or audio data from the mobile communications device 30.

In some embodiments, the artificial-intelligence-based technical support operations may involve receiving, over at least one network, audio signals from a mobile communications device and/or receiving image signals from the mobile communications device via the at least one network. As used herein, the term at least one network may refer to a single network or multiple networks. The network may include a plurality of networks having the same or different protocol stacks which may coexist on the same physical infrastructure. The network may constitute any type of physical or wireless computer networking arrangement used to exchange data. For example, a network may be the Internet, a private data network, a virtual private network using a public network, a Wi-Fi network, a LAN, or WAN network, and/or any other suitable connections that may enable information exchange among various components of the system.

In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between the mobile communications device and the TSC. Signals are received over a network when they are obtained following transmission via the network.

Turning back to FIG. 1A, the disclosed embodiments may involve at least one network 40 capable of transmitting image data, audio data, and/or text data between the mobile communications device 30 and the TSC 60 during the artificial-intelligence-based technical support session 100. For example, the mobile communications device 30 may access and send/receive data to/from the at least one server 54, 56 and/or the control unit 80 of the TSC 60 over the at least one network 40. The control unit 80 of the TSC 60 may also access and send/receive data to/from the mobile communications device 30 and/or the at least one server 54, 56 over the at least one network 40. The at least one server 54, 56 may be configured to collect and/or send information across the at least one network 40 and may be used to facilitate an artificial-intelligence-based technical support session 100, such as a self-service video support session, between the remote user 20 and the TSC 60. The at least one server may be implemented in the TSC 60, such as remote server 56, and/or in the at least one network 40, such as a remote server 54 in a server farm or in a cloud computing environment. Optionally, the at least one server 54, 56 may be configured to carry out some of the tasks of the control unit 80 of the TSC 60, such as but not limited to, AR functionality, tracker functionality, image recognition and/or processing, and speech recognition and/or processing.

A mobile communications device, as disclosed herein, is intended to refer to any device capable of exchanging data using any communications network. In some examples, the mobile communications device may include a smartphone, a tablet, a smart watch, mobile station, user equipment (UE), personal digital assistant (PDA), laptop, wearable sensor, e-Readers, dedicated terminals, smart glasses, virtual reality headset, IoT device, and any other device, or combination of devices, that may enable user communication with a remote server, such as a server of the TSC. Such mobile communications devices may include a display such as an LED display, augmented reality (AR), virtual reality (VR) display, and any other display capable of depicting image data. A mobile communications device may also include an audio sensor and/or image sensor.

An audio sensor, as used herein, is recognized by those skilled in the art and may generally refer to any device capable of capturing audio signals by converting sounds to electrical signals. In some examples, audio sensors may include microphones, unidirectional microphones, bidirectional microphones, cardioid microphones, omnidirectional microphones, onboard microphones, wired microphones, wireless microphones, any combination of the above, and any other sound-capturing device capable of detecting and converting sound signals into electrical signals, such as analog or digital audio signals. The electrical signals may be used to form audio data based on the detected sound signals. In some cases, the audio sensor or sensors may be part of the microphone included in the remote end user's mobile communications device. Alternatively, or additionally, the audio sensor or sensors may be part of an external device, such as a headset, that is connectable to the mobile communications device via a wired or wireless connection.

An image sensor, as used herein, is recognized by those skilled in the art and may generally refer to any device capable of detecting and converting optical input signals in the near-infrared, infrared, visible, ultraviolet, and/or any other light spectrum into electrical signals. The electrical signals may be used to form image data, such as an image, burst of images, or a video stream, based on the detected signal. Some examples of image sensors may include semiconductor charge-coupled devices (CCD), active pixel sensors in complementary metal-oxide-semiconductor (CMOS), or N-type metal-oxidesemiconductors (NMOS, Live MOS). The image sensor may also include both 2D and 3D sensors which may be implemented using different technologies such as stereo camera, active stereo camera, time of flight camera, structured light camera, radar, range image camera. In some cases, the image sensor or sensors may be part of a camera included in the remote end user's mobile communications device. Alternatively, or additionally, the image sensor or sensors may be connectable to the mobile communications device via a wired or wireless connection.

FIGS. 1A and 1B illustrate one example of a mobile communications device 30 including an audio sensor 34, a speaker unit 36, an image sensor 32, and a display unit 31. The amount of information which may be exchanged between the remote user 20 and the TSC 60 via at least one network 40 is considerably increased by using, at the remote site, a mobile communications device 30 capable of exchanging and/or receiving image data and/or audio data, and optionally text data. For example, data transferred from the mobile communications device 30 to the TSC 60 over the at least one network 40, such as data pertaining to input sound signals 35*u* from the user 20 and/or input optical signals 33*o* corresponding to the object of interest 10, may enable the TSC 60 to more accurately provide technical support to the remote user 20. In some embodiments, information transferred over the at least one network 40 to the mobile communications device 30 may be visually displayed on a display unit 31 of the mobile communications device 30 as output image signals 33*m* and/or auditorily produced by a speaker unit 36 of the mobile communications device 30 as output sound signals 35*m*.

The audio sensor 34 may be located on any portion of the mobile communications device 30 and/or connectable to the mobile communications device 30. The audio sensor 34 may be configured to receive input sound signals 35*u*, such as an audible description pertaining to the issue for which support is sought, from the remote user 20 such that a digital representation of the input sound signals 35*u* may be transferable over the at least one network 40 to the TSC 60 as audio data. Alternatively, or additionally, the audio sensor 34 may be configured to receive input sound signals 35*u* from the object of interest 10 which may be transferable over the at least one network 40 to the TSC 60 as audio data. The speaker unit 36 may be located on any portion of the mobile communications device 30 and/or connectable to the mobile communications device 30. In certain embodiments, the speaker unit 36 may be configured to produce output sound signals 35*m*, such as troubleshooting instructions, to the remote user 20.

The image sensor 32 may be located on any portion of the mobile communications device 30 and/or connectable to the mobile communications device 30. The image sensor 32 may be configured to receive input optical signals 33*o* from the remote user 20, such as input optical signals 33*o* corresponding to the object of interest 10 and/or elements thereof, such that a digital representation of said input optical signals 33*o* may be transferable over the at least one network 40 to the TSC 60 as image data. The display unit 31 may be located on any portion of the mobile communications device 30 and/or connectable to the mobile communications device 30. In certain embodiments, the display unit 31 may be configured to present output image signals 33*m*, such as an image, images, and/or video. The output image signals 33*m* may include troubleshooting instructions and/or annotations/markers 39 superimposed onto the annotated object 11.

According to some embodiments, the artificial-intelligence-based technical support operations may involve receiving, over at least one network, first audio signals from a mobile communications device. The first audio signals may include speech data associated with a technical support session. The term "audio signals," as disclosed herein, may refer to any electrical representation of sound, which may, for example, be in the form of a series of binary numbers for digital signals and may be carried over digital audio interfaces, over a network using audio over Ethernet, audio over IP, or any other streaming media standards and systems known in the art. The term "speech data," as disclosed herein, may relate to any data corresponding to audio recordings of human speech. The speech data may be paired with a text transcription of the speech and may be readable and usable for artificial intelligence speech recognition algorithms. For example, various analysis tools may be used to extract and/or analyze the speech data to identify keywords within the speech and/or aid computer vision tools.

Figure 3:
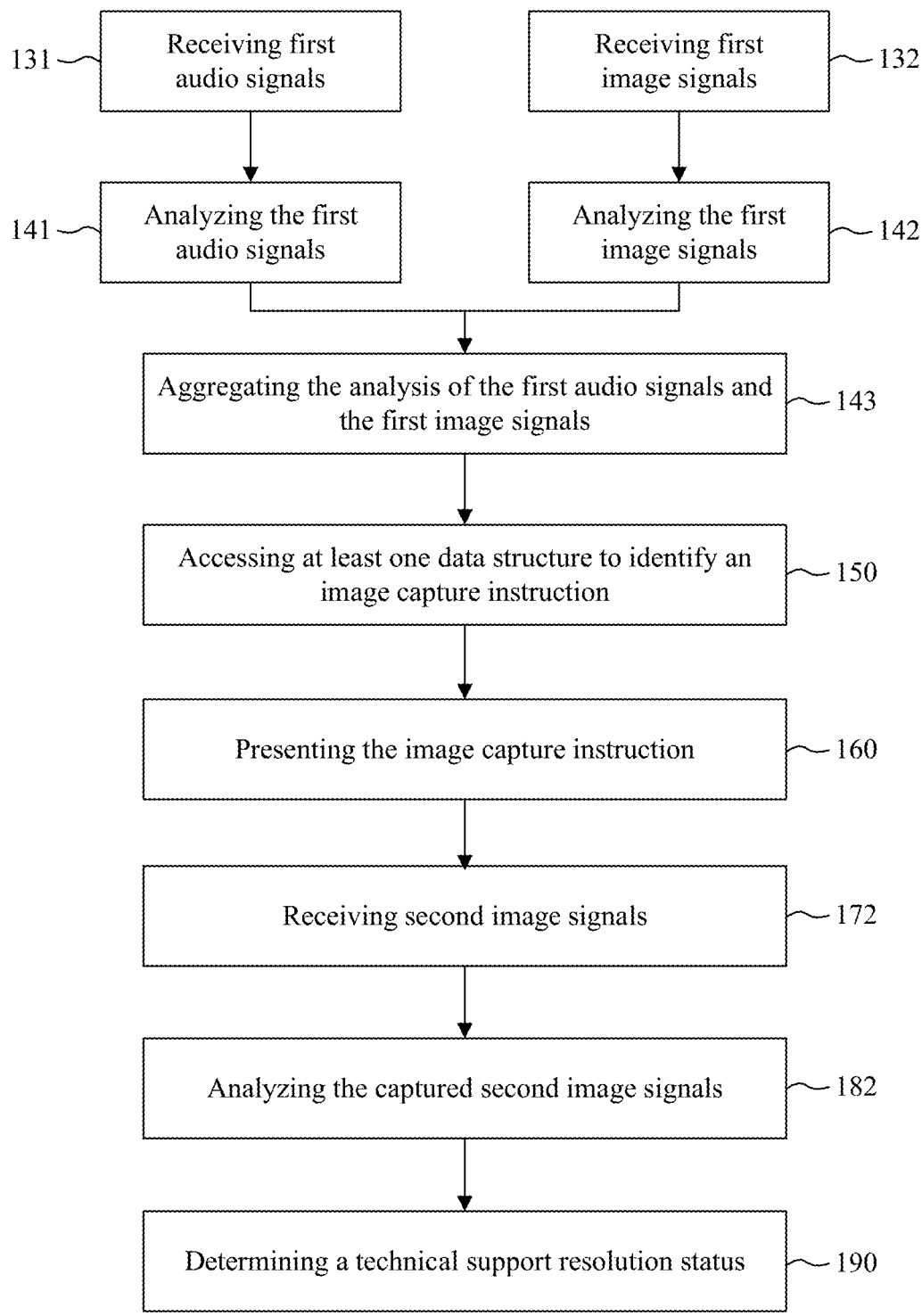
FIG. 3 is a flow chart illustrating an exemplary method for an artificial-intelligence-based technical support session, consistent with at least one embodiment of the present disclosure.
Figure 4:
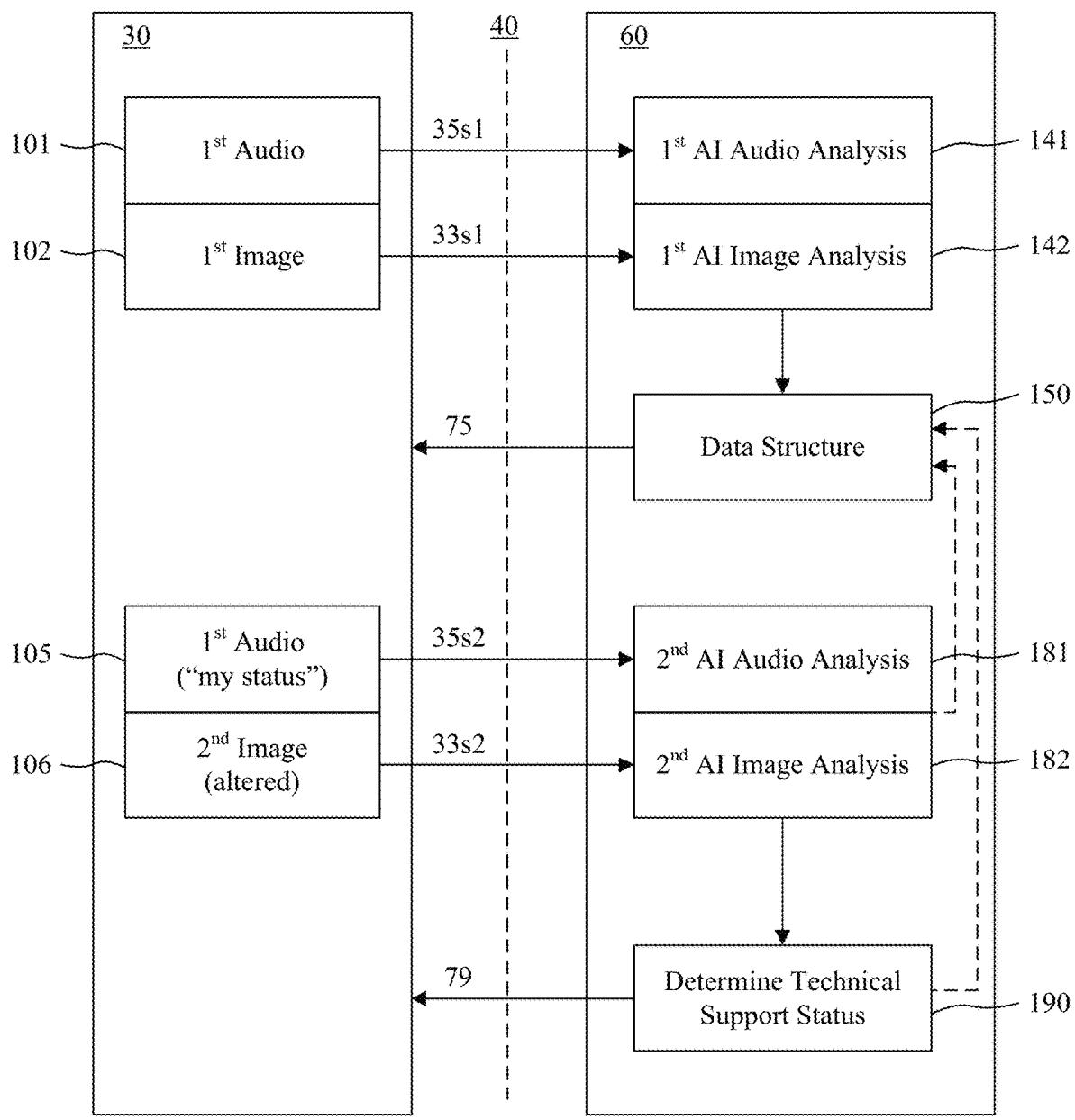
FIG. 4 is a functional flow chart schematically illustrating an artificial-intelligence-based technical support session, consistent with at least one embodiment of the present disclosure.

FIG. 3 is a flow chart illustrating an exemplary method of the artificial-intelligence-based technical support session 100 illustrated in FIG. 1A in which the TSC 60 receives audio data captured by the audio sensor 34 or sensors of the mobile communications device 30 at Step 131. FIG. 4 is a simplified functional flow chart schematically illustrating the artificial-intelligence-based technical support session 100, as illustrated in FIG. 1A, in which audio data is captured by the audio sensor 34 or sensors of the user's mobile communications device 30 at Step 101 and in which the TSC 60 receives the first audio signals 35*s*1 representing the audio data via the at least one network 40 at Step 131. The following examples are presented with reference to the functional flow chart of FIG. 4 together with the network diagram of FIG. 1A, as well as the illustrations of FIGS. 5A-5D.

At Step 101 in FIG. 4, after the remote user 20 establishes connection with the TSC 60, as illustrated in FIG. 1A, the remote user 20 may, by way of input sound signals 35*u*, verbally describe an issue request, request troubleshooting assistance, identify the type of object of interest 10 being used, and/or describe a particular issue pertaining to the object of interest 10 into the audio sensor 34. The input sound signals 35*u* received by the mobile communications device 30 may be transmissible, via the at least one network 40, as first audio signals 35s1. In certain embodiments, the first audio signals 35s1 may include speech data associated with an artificial-intelligence-based technical support session 100. For example, the first audio signals 35s1 may identify a technical issue, that may relate to an audio description of the type of service the remote user specifies, may describe the nature of the issue in natural language, and/or may relate to what actions the user took prior to the technical support session 100. Alternatively, or additionally, the first audio signals 35s1 may relate to an audible demonstration of the type of issue pertaining to the object of interest 10.

The audio data acquired by the audio sensor 34 or sensors of the mobile communications device 30 may then be transmitted as first audio signals 35s1 over the at least one network 40 by wired or wireless transmission to the TSC 60 at Step 131 in FIG. 4. In some embodiments, the first audio signals 35s1 received by the TSC 60 may be a "real-time" audio stream. The term "real-time," as it pertains to audio signals, may relate to on-going audio data which closely approximates events as they are occurring. Such real-time audio streams or "live" feeds may allow, for example, a user 20 to auditorily communicate with respect to an ongoing issue, installation, or repair at one location, and allow the TSC 60 to receive near simultaneous audio signals pertaining to an ongoing issue, installation, or repair. Specific keywords contained in the speech data of the first audio signals 35s1 may be associated with the issues at hand and may be indicative of the type of equipment, appliance, or object of interest 10 needing support.

Figure 5A:
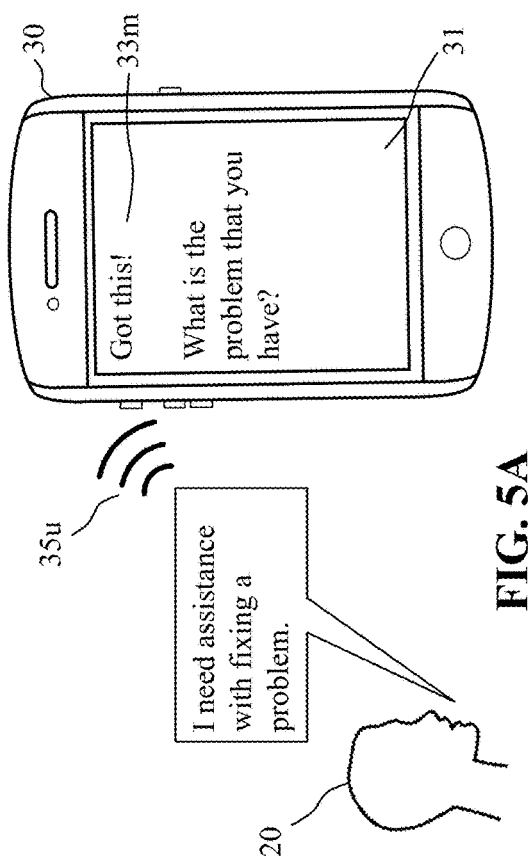
FIGS. 5A-5D illustrate audio signals and analysis thereof during an artificial-intelligence-based technical support session, consistent with at least one embodiment of the present disclosure.
Figure 5B:
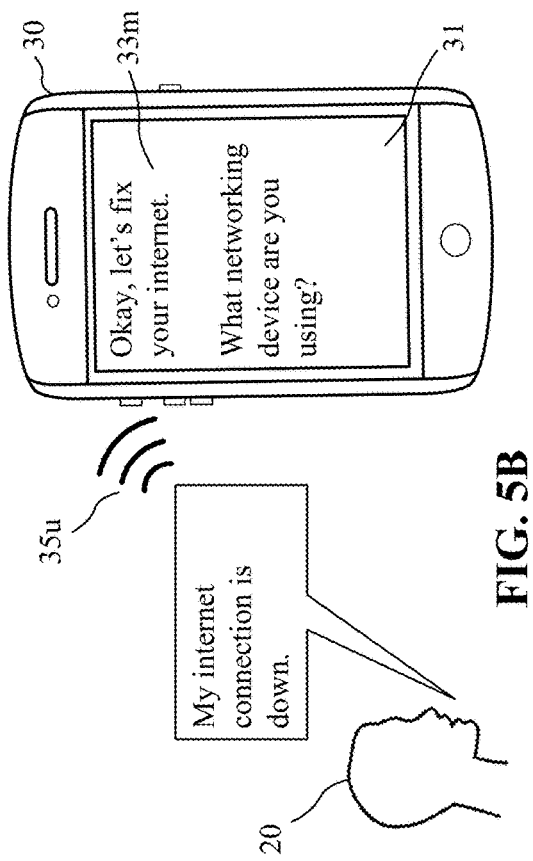
Figure 5C:
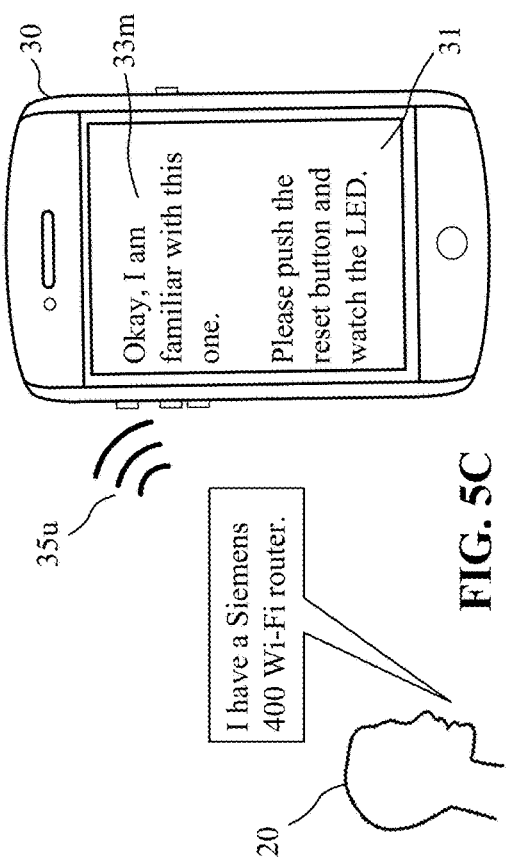
Figure 5D:
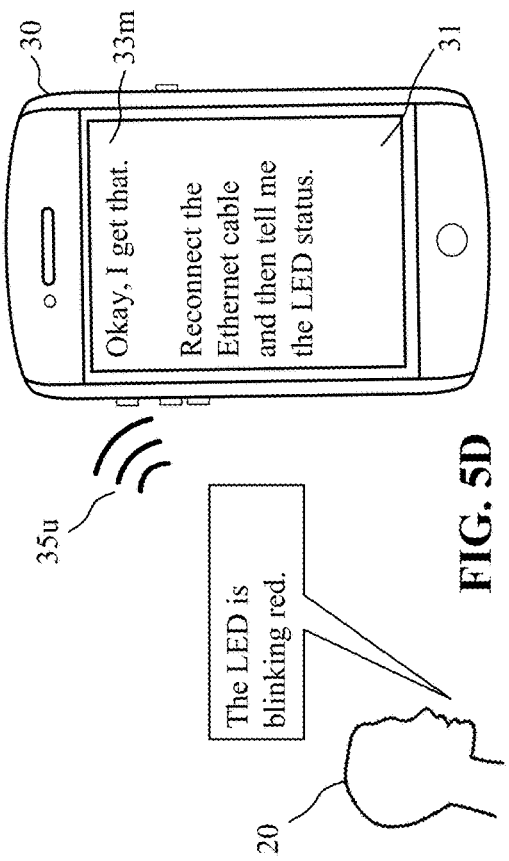

FIGS. 5A-5D illustrate certain non-limiting applications of speech communications in which the remote user 20 requests troubleshooting assistance pertaining to a faulty item/equipment and/or the nature of the encountered problem as it pertains to the object of interest via input sound signals 35u during an artificial-intelligence-based technical support session 100. For example, the remote user 20 may ask for troubleshooting assistance concerning the object of interest such as an electronic device, as illustrated in FIG. 5A, the remote user 20 may specify the type of problem related to the electronic device, as illustrated in FIG. 5B, the remote user 20 may report the type of electronic device being used, as illustrated in FIG. 5C, and/or the remote user 20 may report the working status of the electronic device, as illustrated in FIG. 5D.

According to some embodiments, the artificial-intelligence-based technical support operations may involve receiving first image signals from the mobile communications device via the at least one network. The first image signals may include image data associated with a product for which support is sought. The term "image data" may refer to any form of data generated based on optical signals in the near-infrared, infrared, visible, and ultraviolet spectrums (or any other suitable radiation frequency range). Consistent with the present disclosure, the image data may include pixel data streams, digital images, digital video streams, data derived from captured images, and data that may be used to construct a 3D image. As recited herein, the image data may relate to a single image, a combination or a burst of a sequence of images, a video or videos, or any combination thereof. A product for which support is sought may including any merchandise, article, hardware, software, item, or any other goods for which a customer or a user may seek assistance.

Turning back to the figures, the flow chart of FIG. 3 illustrates an exemplary method of the artificial-intelligence-based technical support session 100 illustrated in FIG. 1A in which the TSC 60 receives image data captured by the image sensor 32 or sensors of the mobile communications device 30 at Step 132. FIG. 4 schematically illustrates a functional flow chart of the artificial-intelligence-based technical support session 100, as illustrated in FIG. 1A, in which image data is captured by the image sensor 32 or sensors of the mobile communications device 30 at Step 102 and in which the TSC 60 receives the first image signals 33s1 corresponding to the image data via the at least one network 40 at Step 132. The following examples are presented with reference to the functional flow chart of FIG. 4 together with the network diagram of FIG. 1A, as well as the illustration of FIG. 6.

At Step 102 in FIG. 4, after the remote user 20 establishes connection with the TSC 60, the remote user 20 may, by way of input optical signals 33o corresponding to the object of interest 10 captured by the image sensor 32, visually capture a particular issue pertaining to the object of interest 10, as illustrated in FIG. 1A. The image data captured by the image sensor 32 of the mobile communications device 30 may be transmissible by wired or wireless transmission, via the at least one network 40, as first image signals 33s1 to the TSC 60. In some embodiments, the first image signals 33s1 may include image data associated with a technical support session 100. For example, the first image signals 33s1 may contain images of the product associated with the technical issue. The first image signals 33s1 may be sent to and received by the TSC 60, via at least one network 40, over a separate channel or channels than the first audio signals 35s1. Alternatively, or additionally, the image data and the audio data may be sent to the TSC 60, via at least one network 40, over a shared channel or channels.

The first image signals 33s1 may include images and/or videos of object or objects of interest for which support is sought, such as an electronic device or devices. The object of interest may include one or more functional elements. The term "functional element" may refer to any component of an object of interest, such as an electrical device, that aids in the function or operation of the object of interest. Such elements may include, for example, jacks, ports, cables, buttons, triggers, indicator lights and switches. It is to be understood that a functional element is not limited to the tangible components of the object of interest. In certain embodiments, the functional elements may relate to a widget of a graphical user interface (GUI) of the object of interest such as a button located on the screen of an object of interest with which a user may interact such that if the widget is pressed by, for example, mouse click or finger tap, some process might be initiated on the object of interest. A given object of interest may have a multitude of functional elements that are part of the object of interest and/or related to the object of interest.

Figure 6:
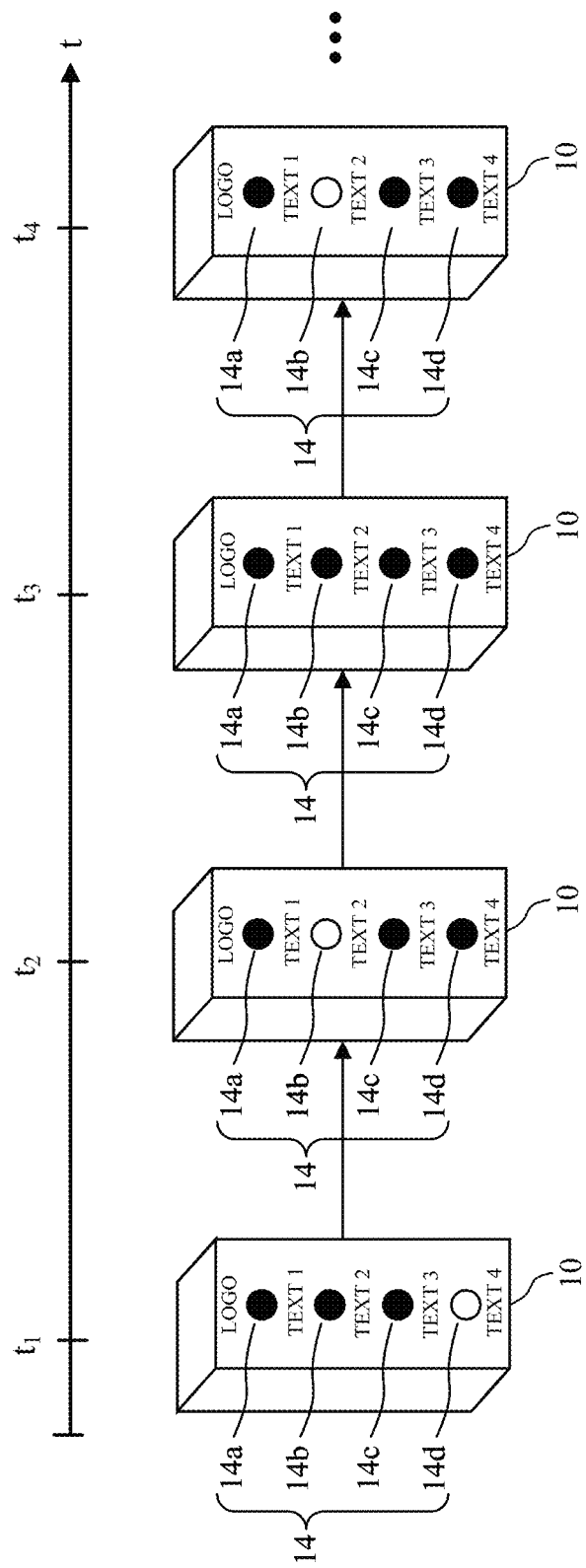
FIG. 6 illustrates image signals and analysis thereof during an artificial-intelligence-based technical support session, consistent with at least one embodiment of the present disclosure.

FIG. 6 illustrates a non-limiting example of input optical signals produced by an object of interest 10 having a first functional element 14a, a second functional element 14b, a third functional element 14c, and a fourth functional element 14d over a period of time (t). The images shown at times t1-t4 correspond to various input optical signals captured by the image sensor 32 of the mobile communications device 30 over an interval of time (t). The captured optical signals are transmissible over the at least one network as first image signals 33s1 to at least one server and/or the TSC during the artificial-intelligence-based technical support session 100 at Step 132 in FIG. 4. For example, at Step 132 the TSC 60 may receive first image signals 33s1 which indicate that certain functional elements 14, such as an LED, is blinking at a given frequency. In the non-limiting example illustrated in FIG. 6, at times t1 and t3, the second functional element 14*b* is "ON;" whereas at times t2 and t4, the second functional element 14*b* is "OFF." Such first image signals 33*s*1 may be analyzable by the control unit 80 of the TSC 60 illustrated in FIG. 1A and enable the TSC 60 to determine the nature of the encountered problem as it pertains to the object of interest 10.

Additionally, or alternatively, the first image signals 33*s*1 received at Step 132 in FIG. 4 may relate to text shown in or on electronic device displays such as PC/laptop monitors and TV displays, control panels, product stickers, and/or any element of the object of interest containing recognizable text such as characters and/or symbols. For example, in the non-limiting example illustrated in FIG. 6, the first image signals 33*s*1 may relate to characters, such as "text 1," "text 2," "text 3," and/or "text 4," and/or symbols, such as "logo," contained on the object of interest 10 and contained in the first image signals 33*s*1.

The image data acquired by the image sensor 32 or sensors of the mobile communications device 30 illustrated in FIG. 1A may then be transmitted as first image signals 33*s*1 over the at least one network 40 by wired or wireless transmission to the TSC 60 at Step 132 in FIG. 4. In some embodiments, the first image signals 33*s*1 received by the TSC 60 may be a "real-time" video stream. The term "real-time," as it pertains to image signals, may relate to on-going image data which closely approximates events as they are occurring. Such real-time video streams or "live" feeds may allow, for example, a user to visually record an ongoing issue, installation, and/or repair at one location using the mobile communications device 30 and allow the TSC 60 to receive near simultaneous image signals pertaining to the ongoing issue, installation, or repair. The "real-time" first image signals 33*s*1 and first audio signals 35*s*1 may be transmitted to at least one processor of the TSC 60 in a single flow or separate sub-flows. Alternatively, either "real-time" first image signals 33*s*1 or first audio signals 35*s*1 may be transmitted to, and received by, at least one processor of the TSC 60.

In some embodiments, the artificial-intelligence-based technical support operations may involve using artificial intelligence to analyze the first audio signals and the first image signals received from the remote end user. The term "analyzing," as used herein, may refer to any the above or below discussed artificial intelligence, machine learning, deep learning, or/and neural network processing techniques. Such techniques may, for example, enable machine learning through absorption of significant volumes of unstructured data such as text, audio, images, and/or videos, as well as user preferences analyzed over a period of time. Any suitable computing system or group of computing systems may be used to implement the analysis of image data, audio data, and/or text data using artificial intelligence.

Figure 7:
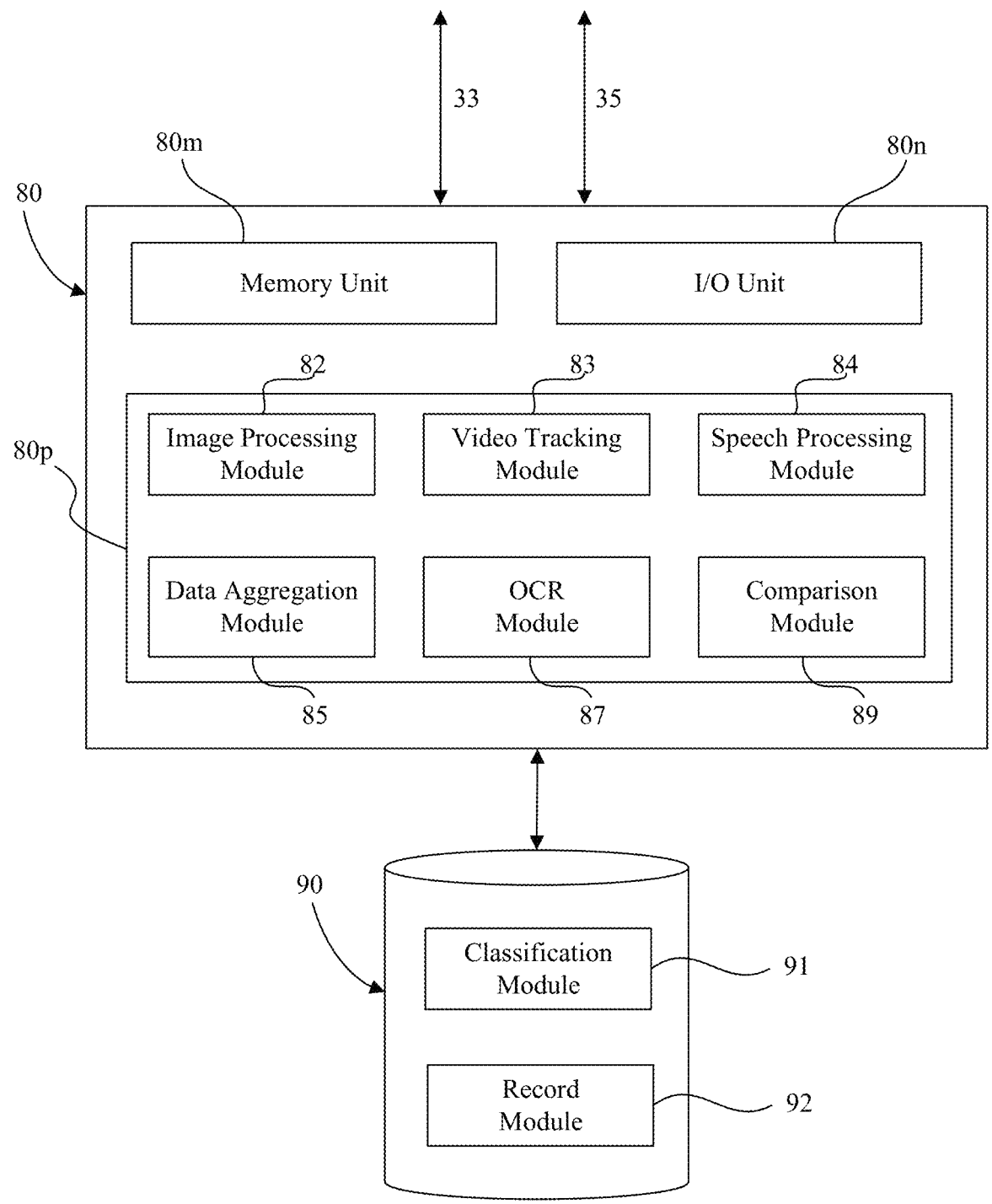
FIG. 7 is a block diagram illustrating components of a control unit and a data structure of the technical support center as illustrated in FIG. 1A, consistent with at least one embodiment of the present disclosure.
Figure 8:
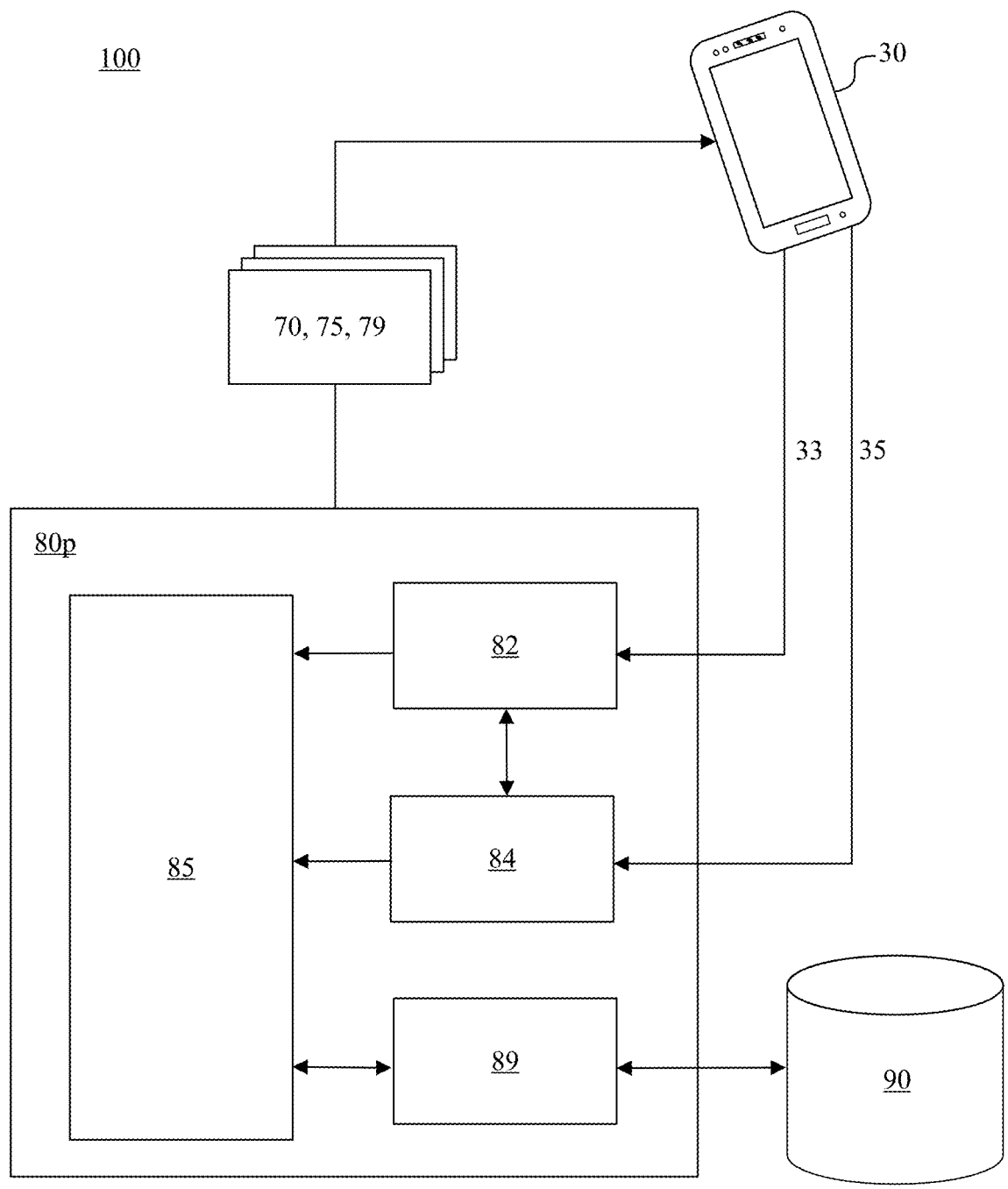
FIG. 8 is a functional block diagram illustrating a system of the technical support center, consistent with at least one embodiment of the present disclosure.

FIG. 7 is a block diagram illustrating a non-limiting embodiment of hardware implementations of the control unit 80 of the TSC 60, as well as the data structure 90 of the TSC 60, as depicted in FIG. 1A. FIG. 8 is a functional block diagram illustrating certain components of the technical support system, consistent with at least one embodiment of the present disclosure. The control unit 80 may be comprised of one or more processors, such as a neural network processor, and may include a data processing unit 80*p*, a memory unit 80*m*, and an input/output unit (I/O unit) 80*n*. The data processing unit 80*p* may be configured and operable to process and analyze image data, audio data, and/or text data received from the mobile communications device using artificial intelligence and may include an image processing module 82, a video tracking module 83, a speech processing module 84, a data aggregation module 85, an optical character recognition module 87, and a comparison module 89. The memory unit 80*m* may be configured and operable as a non-transitory computer readable medium and/or any form of computer readable media capable of storing computer instructions and/or application programs and/or data capable of controlling the control unit 80 and may also store one or more databases. The I/O unit 80*n* may be configured and operable to send and/or receive data over at least one network and/or to at least one server.

The image processing module 82 may be configured and operable to process and analyze image data from the mobile communications device 30. The video tracking module 83 may be configured and operable to ensure that annotations/markers 39 superimposed onto image data remain anchored to a desired object of interest 10, and/or functional element 14 thereof, while the image sensor 32 and/or object of interest 10 move. The speech processing module 84 may be configured and operable to process and analyze the audio signals received from the mobile communications device 30. The data aggregation module 85 may be configured and operable to aggregate data, such as image data, audio data, and/or text data, from various sources, for example the speech processing module 84 an/or the image processing module 82. The optical character recognition (OCR) module 88 may be configured and operable to identify letters/symbols within image data, which may be used to guide the speech processing module 84 and/or the image processing module 82. The comparison module 89 may be configured and operable to compare a data structure 90 of stored reference data to newly acquired input image data and/or audio data.

In some embodiments, the control unit 80 may include a non-transitory computer readable medium capable of performing certain operations of the artificial-intelligence-based technical support session 100 illustrated in FIG. 1A. However, it is to be understood, as noted above, that the non-transitory computer readable medium is not limited to such an implementation. In some embodiments, the data processing unit 80*p* of the control unit 80 may be configured and operable to perform certain operations of the artificial-intelligence-based technical support session 100 using artificial intelligence via the image processing module 82, such as analyzing the first image signals 33*s*1, or corresponding image data, received from the mobile communications device and identifying keywords indicative of the problematic/defective object of interest, its elements/components and/or the nature of the problems experienced by the user. Additionally, or alternatively, the data processing unit 80*p* may be configured and operable to perform certain operations of the artificial-intelligence-based technical support session 100 using artificial intelligence via the speech processing module 84, such as analyzing the first audio signals 35*s*1, or corresponding audio data, received from the mobile communications device and detecting the object of interest and/or elements related to the problem to be resolved.

According to some embodiments, the artificial-intelligence-based technical support session may involve analyzing the first audio signals using artificial intelligence. Audio signals and/or audio data may be analyzed using any of the above-mentioned artificial intelligence techniques. Alternatively, or additionally, audio signals and/or audio data may be analyzed using linguistic processing such as, for example, Natural Language Processing (NLP) techniques. Linguistic processing may involve determining phonemes (word sounds), applying phonological rules so that the sounds may be legitimately combined to form words, applying syntactic and semantic rules so that the words may be combined to form sentences, and other functions associated with identifying, interpreting, and regulating words or sentences. For example, a user may provide an audible input such as by "speaking" to select an automation package, or an automation within the selected automation package, or a condition of an automation within a selected automation package. In some embodiments, the mapping may occur using a combination of linguistic processing and artificial intelligence.

Referring back to the flow chart of FIG. 3 illustrating an exemplary method of the artificial-intelligence-based technical support session 100 illustrated in FIG. 1A, the TSC 60 may be configured to analyze the first audio signals 35$s$1 at Step 141 received from the mobile communications device 30 at Step 131. FIG. 4 schematically illustrates the artificial-intelligence-based technical support session 100 illustrated in FIG. 1A in which the first audio signals 35$s$1 received by the TSC 60 are analyzed by artificial intelligence at Step 141. In some embodiments, the first audio signals 35$s$1 received by the TSC 60 from remote user 20 at Step 131 in FIG. 4 may be processed and analyzed by the control unit 80 of the TSC 60 illustrated in FIG. 7. For example, the speech processing module 84 of the data processing unit 80$p$ at Step 141 in FIG. 4 may be configured and operable to analyze first audio signals 35$s$1 corresponding to the remote user's speech using various artificial intelligence technologies during the artificial-intelligence-based technical support session 100. The various speech analysis and/or processing tools employing artificial intelligence known in the art may be used to analyze the user's speech to identify and/or extract keywords pertaining to the object of interest for which support is sought.

The keywords extracted from the first audio signals 35$s$1 may be associated with the issues at hand for which support is sought and may be indicative of the type of equipment, appliance, or object of interest needing support. Referring back to the example illustrated with respect to FIGS. 5A-5D, the speech processing module 84 may identify that the remote user specifies the type of service the remote user needs including support with installation, as depicted in FIG. 5A (e.g., "I need assistance with fixing a problem"), repairing a technical issue, as depicted in FIG. 5B (e.g., "my internet connection is down"), registering a product, or reporting the type of object of interest being used, as depicted in FIG. 5C (e.g., "I have Siemens 400 Wi-Fi router"). In another example, the speech processing module 84 may identify that the remote user describes the nature of a given issue in natural language. In another example, the speech processing module 84 may identify that the remote user reports what actions he took prior to the artificial-intelligence-based technical support session 100. In another example, the speech processing module 84 may identify that the remote user reports, during the artificial-intelligence-based technical support session 100, how things are coming along an/or issues the remote user is facing (e.g., "I cannot plug the cable into the green socket"). Additionally, or alternatively, the speech processing module 84 may be trained to identify and/or predict certain technical solutions based on learning through linguistic processing and/or historical records.

Disclosed embodiments may involve natural language processing (NLP) techniques. An NLP technique may include any method that enables machines to understand the human language. Such techniques may involve lexical (structure) analysis, parsing, semantic analysis, discourse integration, and pragmatic analysis. For example, using such techniques, the speech processing module 84 may be configured and operable to analyze the audio signals, such as the first audio signals 35$s$1, using natural language processing (NLP) techniques. Optionally, the analysis and/or processing tools in the speech processing module 84 may be used to analyze and/or process varying sentence structures, dialects, and/or languages.

According to some embodiments, the artificial-intelligence-based technical support session may involve analyzing the first image signals using artificial intelligence. Image signals and/or image data may be analyzed using any of the above-mentioned artificial intelligence techniques. Alternatively, or additionally, analyzing image data may include analyzing the image data to obtain reprocessed image data, and subsequently analyzing the image data and/or the preprocessed image data to obtain the desired outcome. One of ordinary skill in the art will recognize that the followings are examples, and that the image data may be preprocessed using other kinds of preprocessing methods. In some examples, the image data may be preprocessed by transforming the image data using a transformation function to obtain a transformed image data, and the preprocessed image data may comprise the transformed image data. For example, the transformed image data may comprise one or more convolutions of the image data. For example, the transformation function may comprise one or more image filters, such as low-pass filters, high-pass filters, band-pass filters, all-pass filters, and so forth. In some examples, the transformation function may comprise a nonlinear function. In some examples, the image data may be preprocessed by smoothing at least parts of the image data, for example using Gaussian convolution, using a median filter, and so forth. In some examples, the image data may be preprocessed to obtain a different representation of the image data. For example, the preprocessed image data may comprise: a representation of at least part of the image data in a frequency domain; a Discrete Fourier Transform of at least part of the image data; a Discrete Wavelet Transform of at least part of the image data; a time/frequency representation of at least part of the image data; a representation of at least part of the image data in a lower dimension; a lossy representation of at least part of the image data; a lossless representation of at least part of the image data; a time ordered series of any of the above; any combination of the above; and so forth. In some examples, the image data may be preprocessed to extract edges, and the preprocessed image data may comprise information based on and/or related to the extracted edges. In some examples, the image data may be preprocessed to extract image features from the image data. Some non-limiting examples of such image features may comprise information based on and/or related to edges; corners; blobs; ridges; Scale Invariant Feature Transform (SIFT) features; temporal features; and so forth.

In some embodiments, analyzing image data may comprise analyzing the image data and/or the preprocessed image data using one or more rules, functions, procedures, artificial neural networks, object detection algorithms, face detection algorithms, visual event detection algorithms, action detection algorithms, motion detection algorithms, background subtraction algorithms, inference models, and so forth. Some non-limiting examples of such inference models may include: an inference model preprogrammed manually; a classification model; a regression model; a result of training algorithms, such as machine learning algorithms and/or deep learning algorithms, on training examples, where the training examples may include examples of data instances, and in some cases, a data instance may be labeled with a corresponding desired label and/or result. Additionally, analyzing image data may comprise analyzing pixels, voxels, point cloud, range data, etc. included in the image data.

Referring back to the exemplary method of the artificial-intelligence-based technical support session 100 illustrated in FIG. 3, the TSC 60 may be configured to analyze the first image signals 33s1 at Step 142 received from the mobile communications device 30 at Step 132. FIG. 4 schematically illustrates the artificial-intelligence-based technical support session 100, in accordance with some embodiments, in which the first image signals 33s1 received by the TSC 60 are analyzed by artificial intelligence at Step 142. The first image signals 33s1 received by the TSC 60 from mobile communications device 30 at Step 132 may be processed and/or analyzed by the control unit 80 of the TSC 60 illustrated in FIG. 7. For example, the image processing module 82 of the data processing unit 80p may be configured to analyze first image signals 33s1 corresponding to the input optical signals 33o of the object of interest 10 captured by the image sensor 32, as illustrated in FIG. 1A. Various image analysis and/or processing tools by the image processing module 82 may be employed to analyze a sequence of first image signals 33s1, such as live video, a burst of several images, or any data that includes a sequence of images, throughout the artificial-intelligence-based technical support session 100.

The image processing module 82 illustrated in FIG. 7 may be configured to execute at least any one of the following features or multiple combinations thereof. In one example, the image processing module 82 may be configured to handle and analyze a sequence of image signals including the first image signals 33s1. In another example, the image processing module 82 may be configured to identify the more relevant images among the sequence of first image signals 33s1 and compare various differences identified within the first image signals 33s1. In another example, the image processing module 82 may be configured to provide feedback to the remote user as to status the of the artificial-intelligence-based technical support session 100. In another example, an algorithm, such as a deep learning algorithm, may be used by the image processing module 82 to detect adjustments to the object of interest in the first image signals 33s1 to identify possible changes, modifications, adjustments, repairs, and/or any other action taken by the remote user.

In some instances, pixel analytics may be employed. Pixel analytics includes any technique that compares groups or distributions of pixels across images to identify similarities. Analytics may be performed on a target image or portion thereof and compared with prior analyses of earlier captured images. The prior analyses may be contained in a data structure. In some instances, artificial intelligence techniques may be employed to identify similarities between images. By way of example, the image processing module 82 may be configured and operable to conduct pixel analytics of the first image signals 33s1.

In one non-limiting example, the image processing module 82 may be configured and operable to conduct LED analysis on the object of interest. For example, the image processing module 82 may be configured to analyze a blinking LED, identify the blinking color (e.g., white/green/red), and/or identify the blinking frequency (e.g., slow/fast). Referring back to the example illustrated with respect to FIG. 6, a sequence of images that were captured rapidly as a burst of several image signals extracted from a video stream may be processed and analyzed by the image processing module 82. For example, the image processing module 82 may be configured to recognize the object of interest 10 and each of the relevant functional elements 14 (i.e., first functional element 14a, second functional element 14b, third functional element 14c, and fourth functional element 14d); wherein each of these functional elements 14 represent a different LED (e.g., power LED, Ethernet LED, Internet LED, and WPS LED). Upon recognizing the various functional elements 14, the image processing module 82 may also identify the individual characteristics, such as color, of the individual functional elements 14a-14d, any characters and/or symbols on or near, and pertaining to, the individual functional elements 14a-14d.

The image processing module 82 may also be configured to identify the status of the functional elements 14a-14d (e.g., ON/OFF) and/or the blinking frequency of the functional elements 14a-14d (e.g., slow/fast) over a period of time (t). For example, the LED light of the third functional element 14c may indicate the status of Internet connectivity. The LED of the third functional element 14c may be in three different states: solid blue (Internet status is functioning properly); OFF (Internet access is down) or blinking blue (Internet access is functioning but unstable). An artificial intelligence vision algorithm may be configured to, via the image processing module 82, distinguish between each of these states by determining whether the LED is blinking, ON, or OFF. Moreover, in another example, additional states may be indicated by different blinking rates, paces, patterns, sequences, colors, or combinations thereof. In this embodiment, the artificial intelligence vision algorithm may be configured to detect the rate, pace, pattern, sequence, color, and/or combination thereof to distinguish between the different states of the respective functional elements 14. Additionally, or alternatively, the image processing module 82 may be configured to analyze functional elements 14 which may relate to a widget of a graphical user interface (GUI) of the object of interest 10 such as a button or text located on the screen of an object of interest 10. For example, in the case of screen/display analysis of the object of interest 10, the image processing module 82 may be configured to track sequences of messages that are shown on said screen/display of the object of interest 10 and conclude information pertaining to the status of setup or recovery process.

In certain embodiments, the image processing module 82 and/or the video tracking module 83 illustrated in FIG. 7 may utilize computer vision tools having tracking capabilities. For example, the image processing module 82 may be configured to identify complex objects of interest and/or functional elements. In another example, the video tracking module 83 may be configured to allow tracking of such complex objects of interest in sophisticated/challenging visioning conditions (e.g., poor lighting, poor resolution, and/or noisy conditions). These capabilities may be implemented by use of neural network tools. Optionally, the image processing module 82 may be configured to filter nonessential image data such that background images, for example the room in which the object of interest is located, may be removed. The above-mentioned techniques, alone or in combination, may enable the system of the TSC 60 to more accurately diagnose a technical solution to a problem pertaining to the object of interest. This way a multitude (e.g., thousands) of video streams can be analyzed by the image processing module 82 implementing the techniques disclosed herein to assist in the artificial-intelligence-based technical support session 100.

In some embodiments, the image processing module 82 may be configured to enable the data processing unit 80p to conduct and draw conclusions from a root cause analysis using multiple images that were captured during the artificial-intelligence-based technical support session 100 an agent-guided session, or via another process. For example, the image processing module 82 may be configured to employ root cause analysis which may include any one of the following features or multiple combinations thereof. In one example, multiple images may be captured and the image signals, such as first image signals 33$s$1, may be analyzed according to a fixed scripted flow, conditionally based on user 20 feedback, and/or conditionally based on individual analysis of the image signals. In another example, the image processing module 82 may be configured to extract and visually analyze meaningful information from each of the images contained in the image signals. In another example, the image processing module 82 may be configured to consult an AI-based knowledge system stored in, for example, the memory unit 80$m$ and/or the data structure 90 illustrated in FIG. 7. The AI-based knowledge system may provide a collection of analyzed information from all images. In another example, the image processing module 82 may be configured to communicate with the knowledge system to generate probable root cause based on aggregated information and a corresponding recovery guideline.

In one non-limiting example, several images related to a reported problem in the stability of internet access may be obtained by an image sensor 32 of a mobile communications device 30 and the corresponding image signals may be analyzed by the image processing module 82 illustrated in FIG. 7 during an artificial-intelligence-based technical support session 100 illustrated in FIG. 1A. The several image signals may relate to various functional elements of an object of interest 10, such as a router, for example, LEDs (as displayed on a front panel of an object of interest), cables (as displayed on a rear panel of the object of interest), a PC screen showing information regarding a Wi-Fi setup of the object of interest, a wall socket including the cable connected to the object of interest. As discussed above, the functional elements need not be a tangible component of the object of interest. Various functional elements may be located in the same image sensor field of view as the object of interest or a different field of view than the object of interest. Additionally, the various functional elements may be located in the same image sensor field of view as the other functional elements or a different field of view than the other functional elements. Thus, the image processing module 82 may be configured to employ artificial intelligence to analyze all images and integrate the information to determine conclusive information regarding the root cause and determine recovery guidance.

In some embodiments, the operations may further comprise using the analysis of the first audio signals 35$s$1 to categorize subject matter of the first image signals 33$s$1. The image processing module 82, as illustrated in FIG. 8, may receive information from the speech processing module 84 corresponding to the analysis of the first audio signals 35$s$1, as analyzed at Step 141 in FIG. 4, in order to more efficiently categorize the subject matter of the first image signals 33$s$1 being analyzed by the image processing module 82. For example, the image processing module 82 may be configured to receive information from the speech processing module 84 pertaining to the specific type of issue the user is having with the object of interest being used in order to more efficiently conduct an analysis of the first image signals 33$s$1.

Additionally, or alternatively, the operations may further comprise using the analysis of the first image signals 33$s$1 to interpret the first audio signals 35$s$1. In certain embodiments, the speech processing module 84, as illustrated in FIG. 8, may be configured to receive information from the image processing module 82 corresponding to the analysis of the first image signals 33$s$1, as analyzed at Step 142 in FIG. 4, in order to more efficiently interpret the first audio signals 35$s$1 being analyzed by the speech processing module 84. For example, the speech processing module 84 may be configured to receive information from the image processing module 82 pertaining to the identity of the object of interest 10 being used in order to more efficiently conduct an analysis of the first audio signals 35$s$1 by utilizing the analysis of the first image signals 33$s$1.

In some embodiments, the artificial-intelligence-based technical support operations may involve aggregating the analysis of the first audio signals and the first image signals. As used herein, aggregating may refer to both audio signals and image signals used to achieve a result or gain an understanding. For example, each of audio and video alone may be insufficient to gain a sufficient understanding of a problem or defect. However, when both are considered, a problem or defect may be identified. In another sense, aggregating may refer to the process of gathering data from various inputs and/or sources for use in achieving a goal. The data may be gathered from at least one data source and may be combined into a summary format for further data analysis. For example, aggregated information from various inputs and/or sources may be combined via data integration in which data from the various inputs and/or sources may be consolidated into a unified dataset in order to provide more concise and/or valuable information in a time efficient manner. Aggregated information from multiple data sources allows for more meaningful and richer information regarding a collective environment which would have been difficult or impossible to obtain if using only a single data source.

Referring back to FIGS. 3-4, during Step 143 of the artificial-intelligence-based technical support session 100, as illustrated in FIG. 1A, the TSC 60 may be configured to aggregate information pertaining to the analysis of the first audio signals 35$s$1, as analyzed at Step 141, and/or information pertaining to the analysis of the first image signals 33$s$1, as analyzed at Step 142. In some embodiments, during the data aggregation step, Step 143, the data aggregation module 85, as illustrated in FIG. 7, may be configured and operable to receive information pertaining to the first image signals 33$s$1 as analyzed by the image processing module 82 and/or information pertaining to the first audio signals 35$s$1 as analyzed by the speech processing module 84.

The artificial-intelligence-based technical support session 100 may aggregate information pertaining to the analysis of the first audio signals 35$s$1, information pertaining to the analysis of the first image signals 33$s$1, and/or additional information stored in, for example the memory unit 80$m$ and/or the data structure 90 illustrated in FIG. 7. The aggregation of various types of data may occur simultaneously or discretely over a period of time or at varying intervals of time. It is to be understood, that where only image signals, such as the first image signals 33$s$1, or audio signals, such as the first audio signals 35$s$1, are received by the TSC 60, the artificial-intelligence-based technical support session 100 may still employ an artificial intelligence algorithm to analyze the image signals or audio signals, and optionally additional data, and integrate the information to form a conclusive determination regarding the root cause of the issue for which support is sought. Optionally, analyzing the first audio signals 35$s$1 at Step 141, analyzing the first image signals 33s1 at Step 142, and aggregating the analysis of the first audio signals 35s1 and the first image signals 33s1 at Step 143 may occur in a singular process during the artificial-intelligence-based technical support session 100.

In some embodiments, based on the aggregated analysis of the first image signals and the first audio signals, the artificial-intelligence-based technical support operations may involve accessing at least one data structure and/or database to identify an image capture instruction. Accessing a data structure, as disclosed herein, may include reading and/or writing information from/to the data structure. The term data structure may relate to a more advanced knowledge-base database from which options, such as a fixed set of prioritized operations, are selected based on some environment of usage conditions. The data structure may include an artificial intelligence-based system that has been trained with data of past cases, their conditions, and the optimal solution of each case.

The data structure may include one or more memory devices that store data and/or instructions. The data structure may utilize a volatile or non-volatile, magnetic, semiconductor, tape, optical, removable, non-removable, other type of storage device or tangible or non-transitory computer readable medium, or any medium or mechanism for storing information. The data structure may include any a plurality of suitable data structures, ranging from small data structures hosted on a workstation to large data structures distributed among data centers. The data structure may also include any combination of one or more data structures controlled by memory controller devices (e.g., server(s), etc.) or software.

The data structure may include a database which may relate to any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures.

As shown in FIGS. 7-8, the data processing unit 80p of the control unit 80 may be configured and operable to consult the data structure 90 such that audio signals analyzed by the speech processing module 84 and/or image signals analyzed by the image processing module 82, and/or the aggregate thereof, may be compared, via comparison module 89, against information stored in the data structure 90. The data structure 90 may serve as a source of information and an advanced knowledgebase configured to store reference data from which support options may be selected based on an environment of usage conditions. The data structure 90 may include a classification module 91 and a record module 92. The classification module 91 may be configured and operable to classify data structure records contained in the record module 92, and/or verify the classification determined for each data structure record contained in the record module 92.

Additionally, a machine learning process of the TSC 60 illustrated in FIGS. 1A, employing any suitable state of the art machine learning algorithm having machine vision and/or deep learning capabilities, may be used to troubleshoot an object of interest 10 during the artificial-intelligence-based technical support session 100. The machine learning process of the TSC 60 may be, for example, incorporated into the data structure 90 and/or the data processing unit 80p. In one non-limiting example, the data structure 90 may be an artificial intelligence system which may be trained with data of past support sessions, their conditions, and/or optimal solutions of past support sessions. For example, the data structure 90 may be configured and operable to log and analyze the users' interactions with the system during various support sessions to identify common user errors. In this way, a dynamic data structure 90 may be constructed such that deep learning algorithms may be used to learn the nature of an issue/defect encountered pertaining to a given object of interest 10 for which support is sought, the best working solutions based on previous related sessions, and construct data structure records cataloguing the successful solutions.

In some embodiments, the TSC 60 may be configured to maintain and utilize the data structure 90 to determine a best matched solution for resolving the remote user's problems and may use a machine deep learning tool, such as the comparison module 89 illustrated in FIG. 8. For example, the comparison module 89 may be configured and operable to analyze data structure records of the data structure 90 relating to previously conducted support sessions, classify the data structure records of the data structure 90 according to the specific type of problem dealt with in various data structure records (e.g., LAN connectivity, wireless connectivity, bandwidth, data communication rates, etc.), identify keywords and/or objects/elements mentioned/acquired during the artificial-intelligence-based technical support session 100, and rank/weigh each data structure record of the data structure 90 according to the number of times it was successfully used to resolve a problem of a particular type/classification. The comparison module 89 may then use the detected problems/defects to determine which past solutions from the data structure 90 may be presented to the user's mobile communications device 30 as a semantic prompt 70 corresponding to the best working solution.

Thus, the data structure 90 may be referenced and/or utilized to analyze classified image data and/or audio data and to deliver a semantic prompt 70 to the user during the artificial-intelligence-based technical support session 100 based on the "lessons" learned from past support sessions related to a certain class of problem. The semantic prompt 70 may be a machine-generated response related to the best working solution for a given object at interest which may indicate what the user is to do next in the artificial-intelligence-based technical support session 100. For example, the semantic prompt 70 may be a question to the user with the intention to better understand the current status of the object at interest (e.g., "When was it last working properly?"; "Have you pressed the rest button?"; "It the top LED light blinking?") and/or some instruction to the user to apply to the object at interest before moving on with the support session (e.g., "Please turn on the power button and confirm after you are done"; "Disconnect the Ethernet cable and confirm after you are done").

After aggregating the first audio signals 35s1 and/or the first image signals 33s1 at Step 143 in FIG. 3, the TSC 60 may be configured and operable to read and/or write information from/to the data structure 90 via the comparison module 89 of the data processing unit 80p illustrated in FIG. 8. At Step 150 in FIGS. 3-4, the comparison module 89 may compare the aggregated analysis of the first audio signals 35s1 analyzed by the speech processing module 84 and/or the first image signals 33s1 analyzed by the image processing module 82 to reference data in the data structure records of the data structure 90. For example, once the data processing unit 80p determines that the aggregated analysis of the newly acquired first audio signals 35s1 and/or first image signals 33s1 correlates to objects, issues, and/or defects as the reference data of the data structure records, the comparison module 89 of the TSC 60 may access the at least one data structure 90 and/or database in order to identify and/or generate one or more semantic prompts 70, such as an image capture instruction 75. The image capture instruction 75 may relate to instruction and/or guidance which may be provided to the remote user 20.

In some embodiments, the artificial-intelligence-based technical support operations may involve presenting the image capture instruction to the mobile communications device via the at least one network. The image capture instruction may include a direction to alter a physical structure identified in the first image signals and to capture second image signals of an altered physical structure. As described herein, a direction to alter a physical structure may relate to any instruction which may prompt the user to change, modify, adjust, repair, and/or take any other action with respect to a device or product for which support is sought, or a functional element thereof. Additionally, or alternatively, the direction to alter a physical structure may relate to any instruction which may prompt the user to change, modify, adjust, repair, and/or take any other action with respect to a peripheral device or product of the primary device or product of interest, or a functional element thereof, which is functionally related to the device or product for which support is sought. The physical structure, as defined herein, may relate to any tangible components, such as a cord or LED, and/or any intangible component, such as a widget of a graphical user interface (GUI) displayed on a screen, to a device or product for which support is sought.

Referring back to the flow chart of FIG. 3 illustrating an exemplary method of the artificial-intelligence-based technical support session 100 and the functional flow chart of FIG. 4 schematically illustrating the artificial-intelligence-based technical support session 100, as illustrated in the network diagram of FIG. 1A, the TSC 60 may be configured to present the image capture instruction 75 at Step 160 to the user's mobile communications device 30. As illustrated in FIG. 8, the image capture instruction 75 determined by the data processing unit 80p may be transmitted to the user's mobile communications device 30. The image capture instruction 75 may be transmitted to the mobile communications device 30 as image data 33, audio data 35, and/or text data via the I/O unit 80n illustrated in FIG. 7 over at least one network. FIGS. 9A-9F illustrates certain non-limiting applications of the data processing unit 80p and sequential semantic prompts 70, such as the image capture instruction 75, displayed on the mobile communications device 30 during the artificial-intelligence-based technical support session 100, as illustrated in the network diagram of FIG. 1A.

Figure 9A:
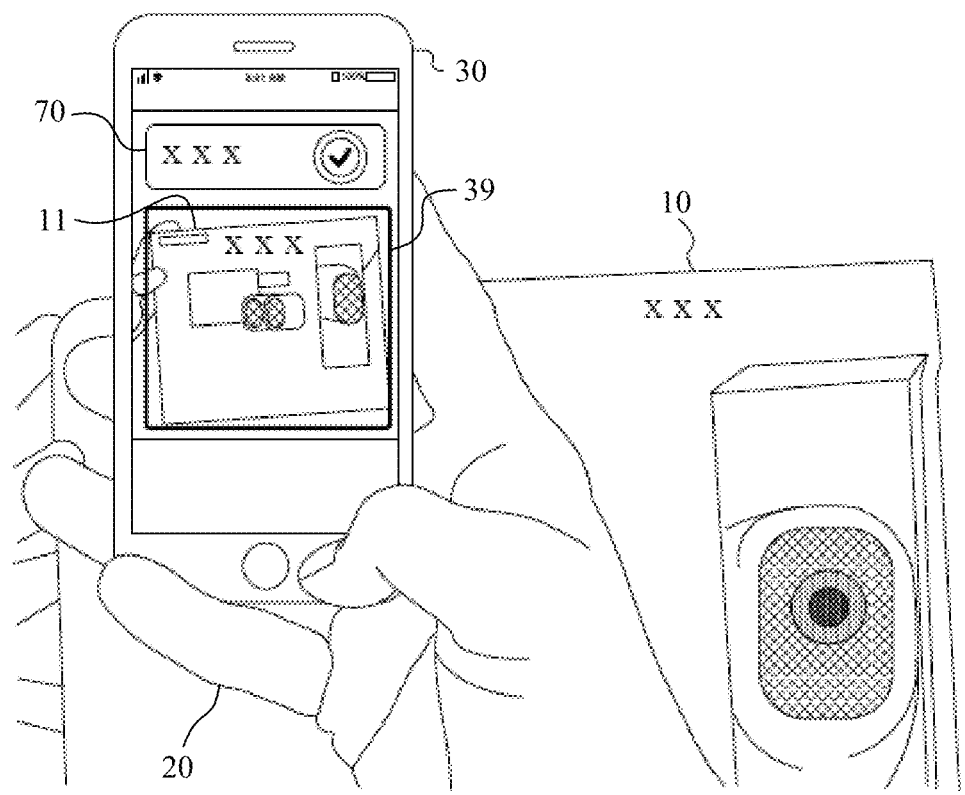
FIGS. 9A-9F illustrates an application of the data processing unit and sequential semantic prompts relating to the solution displayed on the mobile communications device, consistent with at least one embodiment of the present disclosure.
Figure 9C:
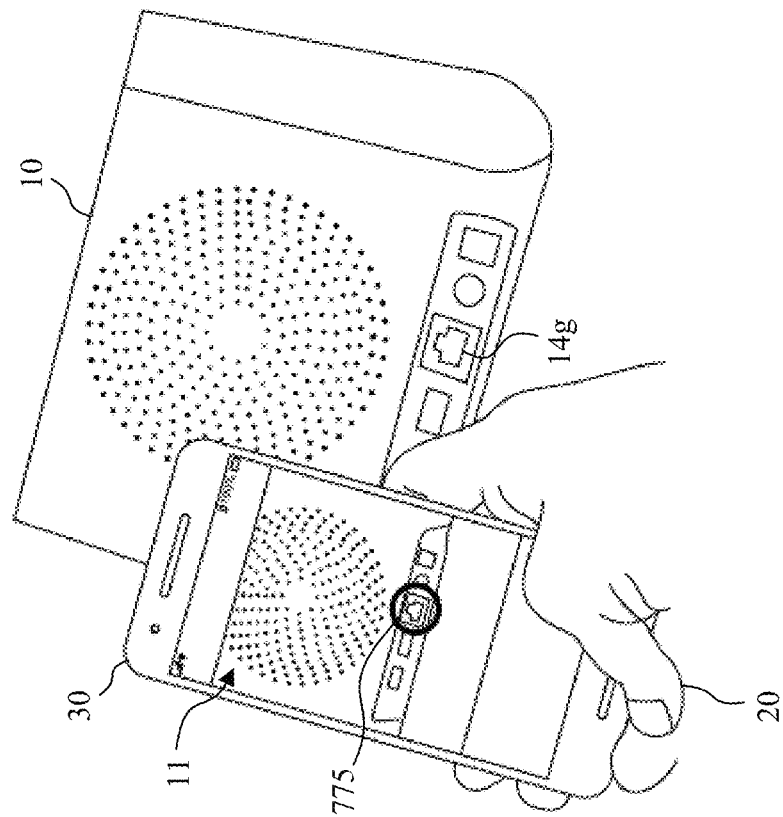
Figure 9B:
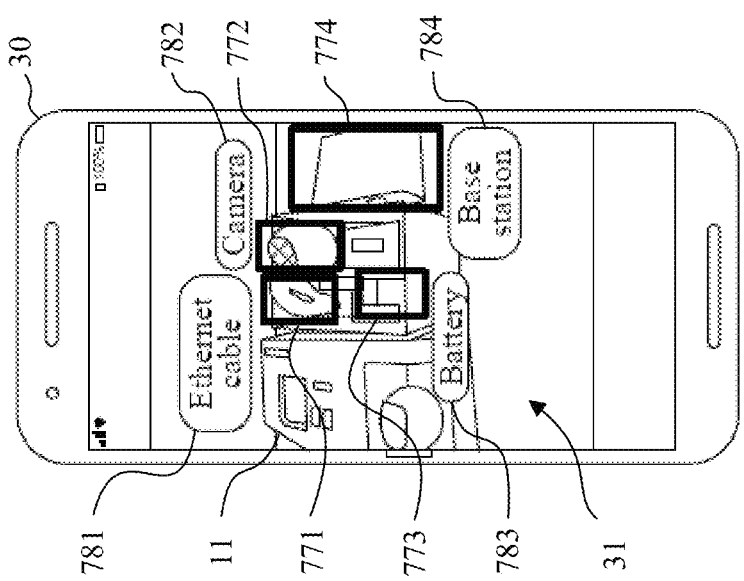

FIG. 9A illustrates one example of the user 20 capturing an image of the object in interest 10 using the mobile communications device 30 during an artificial-intelligence-based technical support session 100 wherein a semantic prompt 70 is displayed on the mobile communications device 30. In this example, the mobile communications device 30 may be configured to present to the user 20 the semantic prompt 70 as well as annotations/markers 39 superimposed onto the annotated object 11. The annotations/markers 39 superimposed onto the annotated object 11 may be automatically generated using artificial intelligence and may outline a digital representation of the object in interest 10 in real-time. FIG. 9B illustrates one example of various annotations and markers superimposed onto various functional elements of the annotated object 11, as depicted on the display unit 31 of the mobile communications device 30. The various markers and annotations illustrated in this example include marker 771 outlining an ethernet cable as noted in annotation 781, marker 772 outlining a camera as noted in annotation 782, marker 773 outlining a battery as noted in annotation 783, and marker 774 outlining a base station as noted in annotation 784. FIG. 9C illustrates one example the user 20 capturing an image of the object in interest 10 such that an annotated object 11 having real-time automated markings corresponding to functional element 14g of the object 10 is depicted on the display unit 31 of the mobile communications device 30. The annotated object 11 includes a marker 775 highlighting a digital representation of the functional element 14g. In this example, the marker 775 is identifying the location of an ethernet port (functional element 14g).

Figure 9D:
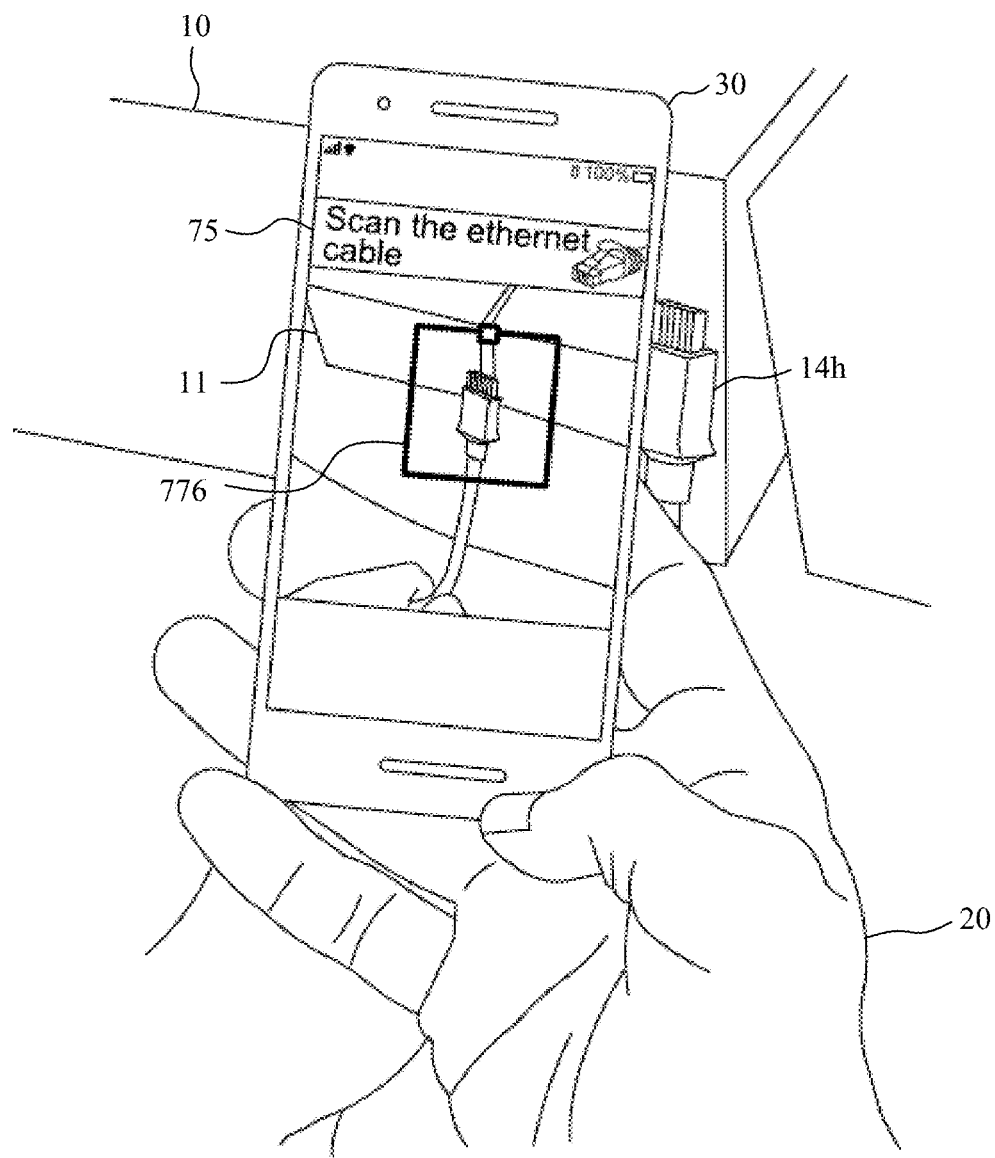
Figure 9E:
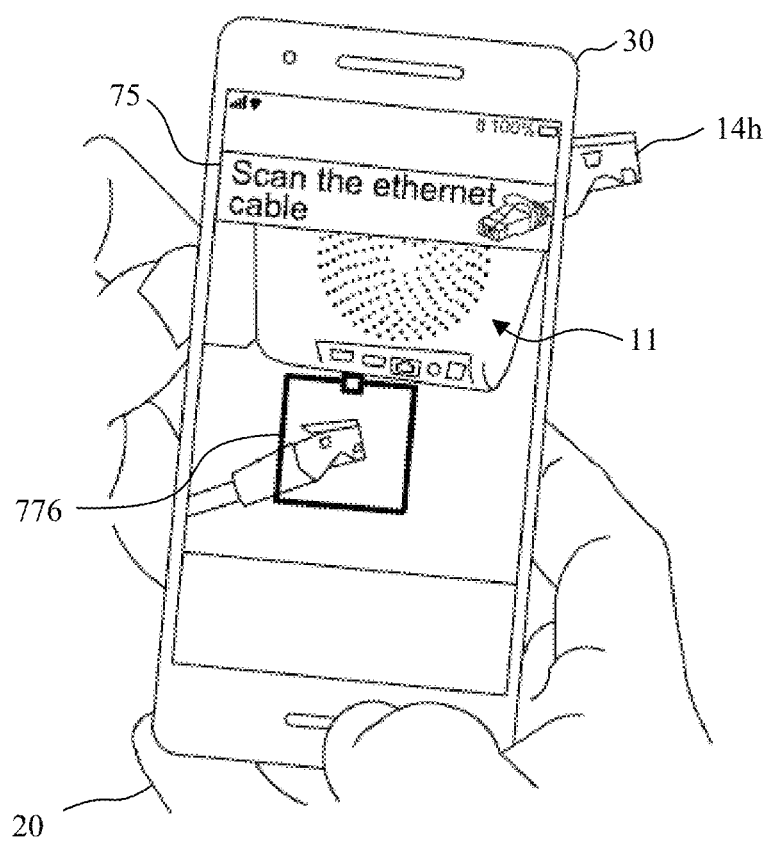
Figure 9F:
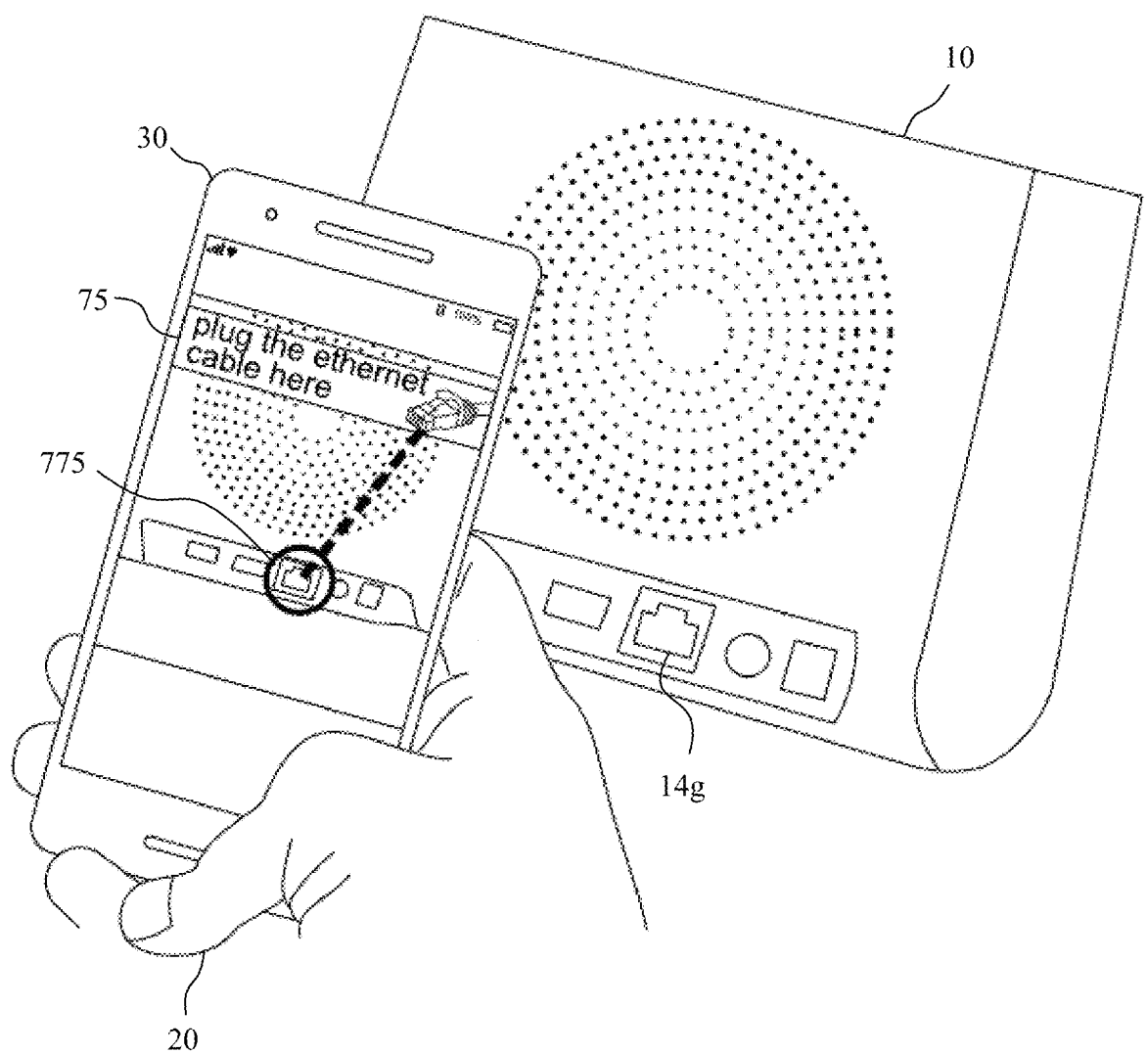

FIGS. 9D-9F illustrate an image capture instruction 75 displayed on the mobile communications device 30 directing the user 20 to alter the physical structure of the object of interest 10. For example, in FIGS. 9D-9E the image capture instruction 75 may instruct the user 20 to scan an ethernet cable, functional element 14h, (e.g., "scan the ethernet cable") to be plugged into the object in interest 10. The image capture instruction 75 may be automatically presented to the user 20 in real-time with marker 776 automatically superimposed onto a digital representation of functional element 14h. The image capture instruction 75 may further instruct the user 20 to plug the ethernet cable into the object of interest 10 (e.g., "plug the ethernet cable here"), as illustrated in FIG. 9F. The image capture instruction 75 may be automatically presented to the user 20 in real-time with marker 775 highlighting a digital representation of functional element 14g.

In one non-limiting example, the user 20 may record the process of plugging the ethernet cable, functional element 14h, into an ethernet port of the object of interest 10, functional element 14g, such that image data acquired the mobile communications device 30 may be transmitted as second image signals 33s2 over the at least one network 40 to the TSC 60, as illustrated in FIG. 4 at Step 106. Alternatively, the user 20 may plug the ethernet cable, functional element 14h, into functional element 14g of the object of interest 10 and then capture image data depicting the ethernet cable, functional element 14h, plugged into the object of interest 10 after the instruction have been followed by the user 20.

In other non-limiting examples, the image capture instruction 75 may, for example, prompt the user 20 to "switch the Audio and Video cables at the back of your TV," "press the reset button for 5 seconds," "type 'reboot' at your PC," "press hard to lock your washing machine door," or "fill at least half of the coffee machine water tank." The semantic prompt 70, or image capture instruction 75, may be a visual and/or audible message. Optionally, an error notification may appear on the mobile communications device 30 such that a change color (e.g., from red to green) occurs when the user 20 correctly responds to the semantic prompt 70. It is to be understood that, in certain embodiments, an unsuccessful attempt to alter the physical structure of the object of interest 10 may constitute an alteration of the physical structure of the object of interest 10 as disclosed herein.

In some embodiments, the artificial-intelligence-based technical support operations may involve receiving from the mobile communications device second image signals corresponding to the altered physical structure via the at least one network. Second image signals corresponding to the altered physical structure may include the output of an image sensor capturing a change to the physical structure that occurred after the first image signals were captured.

Referring back to the flow chart of FIG. 3 illustrating an exemplary method of the artificial-intelligence-based technical support session 100 and the functional flow chart of FIG. 4 schematically illustrating the artificial-intelligence-based technical support session 100 illustrated in the network diagram of FIG. 1A, image data captured by the user's mobile communications device 30 at Step 105 may be received by the TSC 60 as second image signals $33s2$ at Step 172. In certain embodiments, the second image signals $33s2$ may include image data relating to a modification, adjustment, repair, and/or any other action taken by the user with respect to the object of interest, or a functional element thereof. Additionally, or alternatively, the second image signals $33s2$ may include image data relating to a modification, adjustment, repair, and/or any other action taken by the user with respect a peripheral device or product of the object of interest, or a functional element thereof, which is functionally related to the object of interest for which support is sought.

The second image signals $33s2$ received by the TSC 60 may represent a live video, a burst of several images, or any data that includes a sequence of images. In some embodiments, the second image signals $33s2$ received by the TSC 60 may be a "real-time" video stream which closely approximates events as they are occurring. Such real-time video streams or "live" feeds may allow, for example, a user's mobile communication device 30 to visually record an ongoing issue, installation, and/or repair at one location, and the TSC 60 to receive near simultaneous second image signals $33s2$ pertaining to the ongoing issue, installation, or repair. The image data acquired by the image sensor 32 of the mobile communications device 30, as illustrated in FIG. 1A, may be transmitted as second image signals $33s2$ over the at least one network 40 by wired or wireless transmission to the TSC 60. In certain embodiments, the second image signals $33s2$ may be sent to and received by the TSC 60, via at least one network 40, over the same channel or channels as the first image signals $33s1$.

In some embodiments, operations of the artificial-intelligence-based technical support session may involve, after presenting the image capture instruction, receiving from the mobile communications device second audio signals via the at least one network. The second audio signals may correspond to a status of the altered physical structure. Receiving the second audio signals may involve processes previously described for receiving the first audio signals.

In the artificial-intelligence-based technical support session 100 illustrated in FIG. 4, second image signals $33s2$ may be sent with second audio signals $35s2$ at Step 106. The process of transmitting the second audio signals $35s2$ may involve processes previously discussed for sending the first audio signals $35s1$ to the TSC 60 at Step 101 in FIG. 4. For example, at Step 106 of the artificial-intelligence-based technical support session 100, the user may report to the TSC 60 how things are coming along or issues that the user is facing (e.g., "I cannot plug the cable into the green socket"). The second audio signals $35s2$ may be transmitted to and received by the at least one processor of the TSC 60 along with the second image signals $33s2$ in a single flow or in separate sub-flows. It is to be understood that the second audio signals $35s2$ and/or the second image signals $33s2$ may be transmitted to the TSC 60 without signal interruption relative to the transmission of the first audio signals $35s1$ and/or the first image signals $33s1$. Alternatively, the second audio signals $35s2$ and/or second image signals $33s2$ may be transmitted to the TSC 60 after a break in signal transmission relative to the transmission of the first audio signals $35s1$ and/or the first image signals $33s1$.

In some embodiments, the artificial-intelligence-based technical support operations may involve analyzing the captured second image signals using artificial intelligence. In a general sense, analyzing the captured second image signals using artificial intelligence may occur in a manner similar to the analysis of the first image signals previously discussed.

Referring back to the flow chart of FIG. 3 illustrating an exemplary method of the artificial-intelligence-based technical support session 100 and the functional flow chart of FIG. 4 schematically illustrating the artificial-intelligence-based technical support session 100 illustrated in the network diagram of FIG. 1A, the TSC 60 may be configured to analyze the second image signals $33s2$ at Step 182 received from the mobile communications device 30 at Step 172 using artificial intelligence. At Step 182, the second image signals $33s2$ received by the TSC 60 from the remote user's mobile communications device 30 at Step 172 may be processed and/or analyzed by the control unit 80 of the TSC 60 using, for example, the image processing module 82 of the data processing unit $80p$ illustrated in FIG. 8. In some embodiments, the second image signals $33s2$ analyzed using artificial intelligence at Step 182 in FIGS. 3-4 may be analyzed in a manner similar to the analysis of the first image signals $33s1$ using artificial intelligence at Step 142, as discussed above.

The following non-limiting examples are presented with reference to the functional flow chart of FIG. 4 together with the functional block diagram of FIG. 8. In one example, the image processing module 82 illustrated in FIG. 8 may be configured to handle and analyze a sequence of several second image signals $33s2$. In another example, the image processing module 82 may be configured to identify the more relevant images among the sequence of second image signals $33s2$ and compare various differences identified within the second image signals $33s2$ and/or compare differences between the first image signals $33s1$ and the second image signals $33s2$. In another example, the image processing module 82 may be configured to adopt to various bandwidth levels. In another example, the image processing module 82 may be configured to provide feedback to the mobile communications device 30 as to the ending of the artificial-intelligence-based technical support session 100. In another example, an algorithm, such as a deep learning algorithm, may be used by the image processing module 82 to detect a problematic object of interest in the first image signals 33s1 and to identify possible issues/defects causing the problem encountered by the remote user. In another example, the image processing module 82 may be configured and operable to conduct pixel analytics of the first image signals 33s1 and/or the second image signals 33s2. In a general sense, analyzing the captured second image signals 33s2 using pixel analytics may occur in a manner similar to the analysis of the first image signals 33s1 using pixel analytics previously discussed.

In another example, a sequence of images captured rapidly by the mobile communications device 30 as a burst of several second image signals 33s2 may be extracted from a video stream and may be processed and analyzed by the image processing module 82 illustrated in FIG. 8. For example, the image processing module 82 may be configured and operable to identify a change in the rate, pace, pattern, sequence, color, and/or combination thereof of the functional elements 14a-14d illustrated in FIG. 6, as compared to earlier obtained first image signals 33s1 to determine an updated status of the object of interest 10. Thus, the image processing module 82 may be configured to employ artificial intelligence in the analysis of the first image signals 33s1 and the second image signals 33s2, and integrate the information, to determine a conclusive decision regarding the root cause of the technical issue for which support is sought.

In some embodiments, based on the analysis of the second image signals, the artificial-intelligence-based technical support operations may involve determining a technical support resolution status. Determining a technical support resolution status, as used herein, may involve concluding whether the subject issue has been resolved or whether the issue has not been resolved. Determining the resolution status may alternatively involve concluding whether the issue is not resolvable or whether additional communication is needed to resolve the issue. The resolution status may be provided to a user seeking technical support as an indication that the issue has been resolved during the automated technical support session or that human intervention may be required to resolve the issue.

By way of example, after analyzing the captured second image signals 33s2 corresponding to the altered object of interest 10, the artificial-intelligence-based technical support session 100 illustrated in FIGS. 3-4, may use artificial intelligence at Step 182, and the TSC 60 may be configured and operable to determine a technical support resolution status 79 at Step 190. At Step 190, the comparison module 89 may compare the analysis of the second image signals 33s2 analyzed by the image processing module 82 to reference data in the data structure records of the data structure 90, as illustrated in FIG. 8. In some embodiments, the comparison module 89 of the TSC 60 may access the at least one data structure 90 in order to determine whether the newly acquired second image signals 33s2, as compared to previously acquired first image signals 33s1, contain similar resolution indications as the reference data of the data structure records. Thus, the comparison module 89 is configured and operable to analyze the outcome of the altering actions to determine the technical support resolution status 79. The technical support resolution status 79 determined at Step 190 may then be transmitted to the mobile communications device 30 as image data, audio data, and/or text data via at least one network.

In some embodiments, the technical support resolution status may include an indication that a technical support issue is resolved. By way of example, in determining a technical support resolution status 79 at Step 190 of the artificial-intelligence-based technical support session 100 illustrated in FIGS. 3-4, the data processing unit 80p of the TSC 60 may conclude that the technical issue pertaining to the object of interest 10 for which support is sought has been resolved. The TSC 60 may then present a technical support resolution status 79 to the mobile communications device 30 indicating that the issue has been resolved (e.g., "Great! All is working well" or "It is very likely that your device works okay now but we recommend that you double check in a couple of days") and/or the TSC 60 may terminate the artificial-intelligence-based technical support session 100.

Alternatively, the technical support resolution status may include an indication that a technical support issue is not resolved. By way of example, in determining a technical support resolution status 79 at Step 190 of the artificial-intelligence-based technical support session 100 illustrated in FIGS. 3-4, the data processing unit 80p may conclude that the technical issue pertaining to the object of interest 10 for which support is sought has not been resolved. In the event that the technical support resolution status 79 includes an indication that the technical issue pertaining to the object of interest 10 for which support is sought has not been resolved, certain operations of the artificial-intelligence-based technical support session 100 may be conducted iteratively in real time until the user's problem is resolved.

In some embodiments, when the technical support resolution status includes an indication that a technical support issue has not been resolved, the artificial-intelligence-based technical support operations may involve sending a prompt to the mobile communications device seeking additional audio signals and/or additional image signals, analyzing following receipt and in an aggregated fashion, the additional audio signals and the additional image signals, performing an additional lookup in the at least one data structure to determine an associated remedial measure, and/or presenting the remedial measure to the mobile communications device.

By way of example, in the event that the technical support resolution status 79, illustrated in FIG. 4, includes an indication that the technical issue pertaining to the object of interest for which support is sought has not been resolved the TSC 60 may be configured to request that the user provide additional audio signals and/or additional image signals upon determining that a technical support issue has not been resolved at Step 190. In a general sense, requesting the additional audio signals and/or additional image signals may occur in a manner similar to the requesting of the second image signals 33s2 and/or second audio signals 35s2 discussed herein.

Upon receiving additional audio signals and/or additional image signals from the user's mobile communications device 30, the TSC 60 may be configured to analyze the additional audio signals and/or the additional image signals following receipt in an aggregated fashion. In a general sense, analyzing and aggregating the additional audio signals and/or additional image signals may occur in a manner similar to the analyzing and aggregating of first image signals 33s1 and/or first audio signals 35s1 previously discussed. Upon analyzing additional audio signals and/or additional image signals from the user's mobile communications device 30, the TSC 60 may be configured to perform an additional lookup in the at least one data structure 90 to determine an associated remedial measure. In a general sense, performing the additional lookup in the at least one data structure 90 may occur in a manner similar to accessing at least one data structure 90 to identify a semantic prompt 70 and/or an image capture instruction 75 as discussed herein. Upon determining an associated remedial measure, the TSC 60 may be configured to present the remedial measure to the mobile communications device 30. In a general sense, presenting the remedial measure may occur in a manner similar to presenting the image capture instructions 75 previously discussed.

In some embodiments, when the technical support resolution status includes an indication that a technical support issue has not been resolved, the artificial-intelligence-based technical support operations may involve linking the mobile communications device to a human agent for further assistance. By way of example, in the event that the technical support resolution status 79, illustrated in FIG. 4, includes an indication that the technical issue pertaining to the object of interest for which support is sought has not been resolved, the TSC 60 may present a technical support resolution status 79 to the user's mobile communication device 30 including guidance on issues that were not resolved during the artificial-intelligence-based technical support session 100 and/or linking the mobile communications 30 device to a human technical support agent for further assistance. For example, the TSC 60 may indicate that a live service agent may be contacted to resolve the user's problem (e.g., "Some issues were not resolved during this session. Let me connect you with a live agent for further assistance.") or may indicate that the issue is irresolvable (e.g., "We figure that your product has a severe problem. Let me connect you with our online store for free replacement.").

When the remote user successfully resolves the problem by following the instructions, which may be annotated/superimposed on the mobile communications device 30, the problem and/or solution may be stored in the record module 92 of the data structure 90 illustrated in FIGS. 7-8. In some embodiments, the data structure 90 may serve as a cloud or other database record system. By storing various problems and/or solutions in the data structure 90, a database of working solutions may be gradually established. In certain embodiments, the database of working solutions stored in the data structure 90 may be used by the TSC 60 to more quickly and efficiently solve future problems. Alternatively, the data structure 90 may form an artificial intelligence, whereby the artificial intelligence of the data structure 90 solves the problem using the stored image data and/or audio data. For example, the data structure 90 may automatically identify issues pertaining to the object for which support is sought using stored image data and/or audio data and may identify appropriate augmented indicators to be presented to the remote user 20, such as the annotations/markers 39 illustrated in FIG. 1B.

According to another embodiment, operations of the artificial-intelligence-based technical support session may involve, based on the aggregated analysis of the first audio signals and the first image signals, accessing the at least one data structure containing a plurality of semantic prompts; using the aggregated analysis of the first audio signals and the first image signals to select a first semantic prompt from the at least one data structure; presenting the first semantic prompt to the mobile communications device via the at least one network; receiving from the mobile communications device a first response to the first semantic prompt via the at least one network; analyzing the first response to the first semantic prompt; and based on the analysis of the first response, accessing the at least one data structure to identify the image capture instruction.

Figure 10:
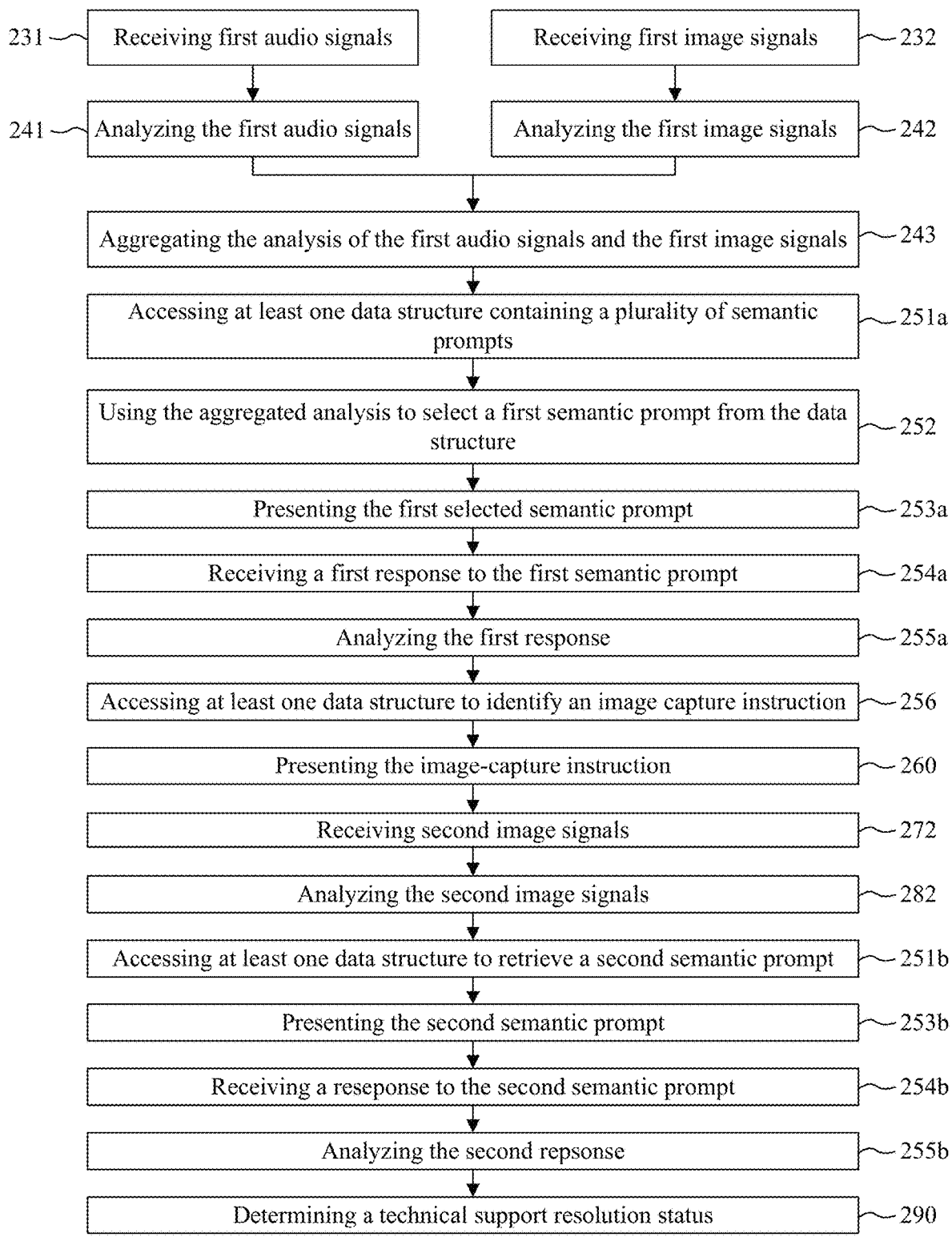
FIG. 10 is a flow chart illustrating an exemplary method for an artificial-intelligence-based technical support session, consistent with another embodiment of the present disclosure.
Figure 11:
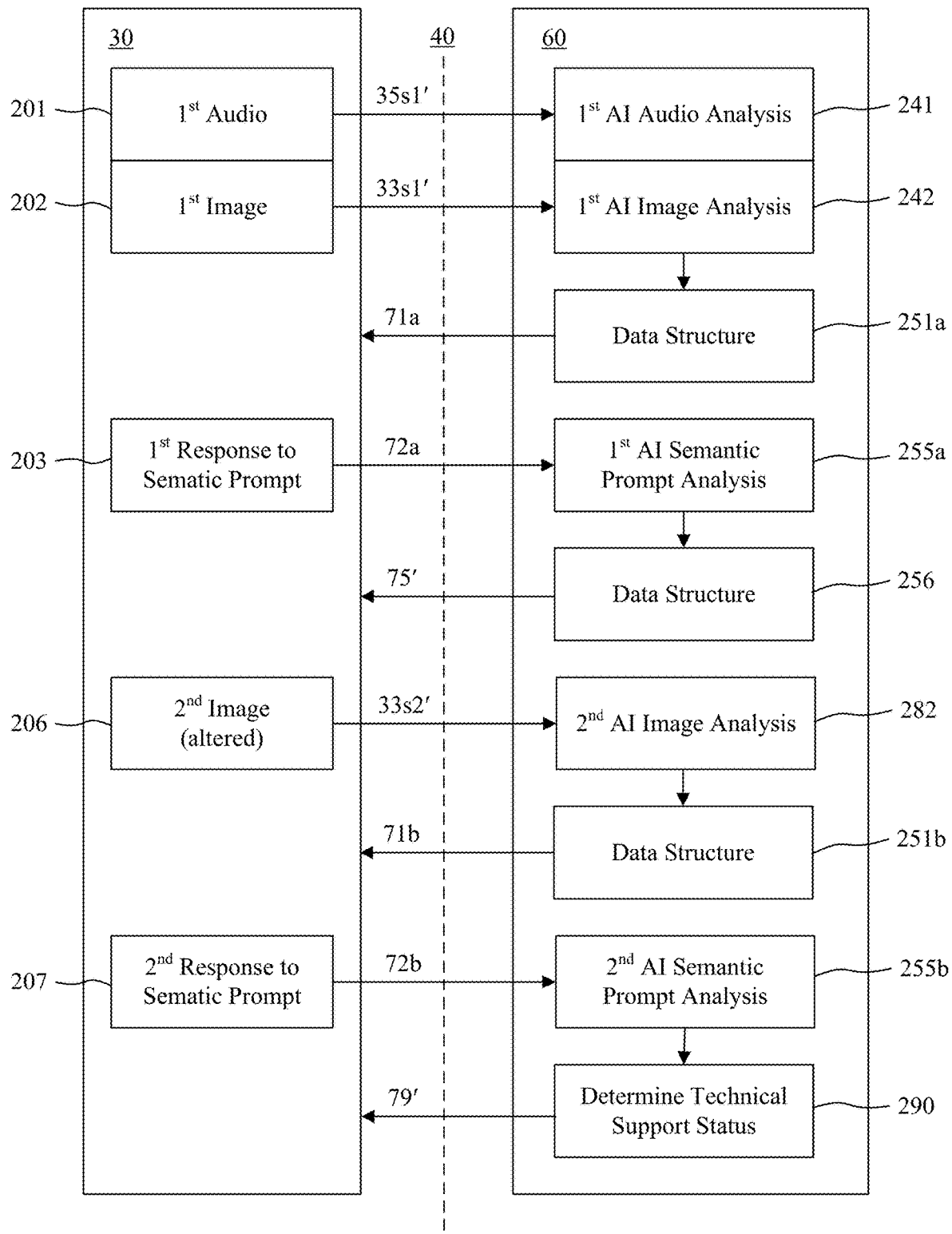
FIG. 11 is a functional flow chart schematically illustrating an artificial-intelligence-based technical support session, consistent with another embodiment of the present disclosure.

FIG. 10 is a flow chart illustrating an exemplary method for an artificial-intelligence-based technical support session 200. In a general sense, the technical support system for performing operations of the artificial-intelligence-based technical support session 200 may be configured in a manner similar to the system for performing operations of the artificial-intelligence-based technical support session 100 illustrated in the network diagram of FIG. 1A. Additionally, in some embodiments, certain aspects of the technical support operations illustrated in the flow chart of FIG. 10 may be performed in a manner similar to the previously discussed technical support operations illustrated in the flow chart of FIG. 3. FIG. 11 is a simplified functional flow chart schematically illustrating the artificial-intelligence-based technical support session 200, in accordance with some embodiments. In a general sense, certain aspects the artificial-intelligence-based technical support session 200 illustrated in FIG. 11 may be similar to aspects of the artificial-intelligence-based technical support session 100 illustrated in FIG. 4. The following examples are presented with reference to FIGS. 10-11 together with the network diagram of FIG. 1A.

In one embodiment, the artificial-intelligence-based technical support operations may involve receiving over at least one network first audio and/or first image signals from a mobile communications device. In the artificial-intelligence-based technical support session 200 illustrated in FIGS. 10-11, the TSC 60 may be configured to, at Step 231, receive first audio signals $35s1'$ corresponding to the audio data captured by the audio sensor of the mobile communications device 30 at Step 201. Additionally, the TSC 60 may be configured to, at Step 232, receive first image signals $33s1'$ corresponding to the image data captured by the image sensor of the mobile communications device 30 at Step 202. In some embodiments, the steps of presenting the first audio signals $35s1'$ at Step 201 and/or the first image signals $33s1'$ at Step 202 from the mobile communications device 30 to the TSC 60 may occur in a manner similar to the operations disclosed above at Steps 101 and 102 of FIGS. 3-4, respectively. Additionally, in some embodiments, the steps of receiving the first audio signals $35s1'$ at Step 241 and/or the first image signals $33s1'$ at Step 242 may be similar to the operations disclosed above at Steps 131 and 132 of FIGS. 3-4, respectively.

In one embodiment, the artificial-intelligence-based technical support operations may involve analyzing the first audio signals and/or the first image signals using artificial intelligence. In the artificial-intelligence-based technical support session 200 illustrated in FIGS. 10-11, once the first audio signals $35s1'$ are received by the TSC 60 from the mobile communications device 30 at Step 231, the first audio signals $35s1'$ may be processed and analyzed by the control unit 80 of the TSC 60 illustrated in FIGS. 7-8 using, for example, the speech processing module 84 of the data processing unit $80p$ at Step 241 of FIGS. 10-11. Additionally, or alternatively, once the first image signals $33s1'$ are received by the TSC 60 from the mobile communications device 30 at Step 232, the first image signals $33s1'$ may be processed and/or analyzed by the control unit 80 of the TSC 60 illustrated in FIGS. 7-8 using, for example, the image processing module 82 of the data processing unit $80p$ at Step 242 of FIGS. 10-11. In some embodiments, the steps of analyzing the first audio signals $35s1'$ at Step 241 and/or the steps of analyzing the first image signals $33s1'$ at Step 242 may occur in a similar manner to the operations disclosed above at Steps 141 and 142 of FIGS. 3-4, respectively.

In another embodiment, the artificial-intelligence-based technical support operations may involve aggregating the analysis of the first audio signals and the first image signals.

In a general sense, aggregating the analysis of the first audio signals and the first image signals may occur in a manner similar to aggregating the analysis of the first audio signals and the first image signals previously discussed. In the artificial-intelligence-based technical support session 200 illustrated in FIGS. 10-11, the TSC 60 may be further configured to aggregate information, at Step 243, pertaining to the analysis of the first audio signals 35$s$1', as analyzed by the speech processing module 84 at Step 241, and/or information pertaining to the analysis of the first image signals 33$s$1', as analyzed by the image processing module 82 at Step 242, using the data aggregation module 85 illustrated in FIGS. 7-8. In some embodiments, aggregating the analysis of the first audio signals 35$s$1' and/or the first image signals 33$s$1' at Step 243 of FIGS. 10-11 may occur in a similar manner to the operations disclosed above at Step 143 of FIGS. 3-4.

In another embodiment, the artificial-intelligence-based technical support operations may involve accessing the at least one data structure containing a plurality of semantic prompts. Accessing the at least one data structure containing a plurality of semantic prompts may be based on the aggregated analysis of the first audio signals and/or the first image signals. In a general sense, accessing the at least one data structure containing a plurality of semantic prompts based on the aggregated analysis of the first audio signals and/or the first image signals may occur in a manner similar to accessing the at least one data structure to identify an image capture instruction based on the aggregated analysis of the first audio signals and/or the first image signals previously discussed.

In the artificial-intelligence-based technical support session 200 illustrated in FIGS. 10-11, the TSC 60 may be configured to access, at Step 251$a$, the at least one data structure 90 illustrated in FIGS. 7-8 containing a plurality of semantic prompts 70 based on the aggregated analysis of the first image signals 33$s$1' and the first audio signals 35$s$1' at Step 243. In some embodiments, the comparison module 89 may use detected problems/defects in the first image signals 33$s$1' and/or the first audio signals 35$s$1' to determine which past solutions from the data structure 90 may be presented to the mobile communications device 30 as a semantic prompt 70 corresponding to a best working solution. For example, the comparison module 89 may be used to analyze classified image data and/or audio data in the data structure 90 to deliver at least one semantic prompt 70 to the mobile communications device 30 during the artificial-intelligence-based technical support session 200 based on the "lessons" learned from past support sessions related to a certain class of problem.

In other embodiments, during the technical support session 100 illustrated in FIG. 8, the data processing unit 80$p$ may be configured and operable to access at least one data structure 90 and/or database in order to identify and/or generate one or more semantic prompts 70 which may be presented to the mobile communications device 30. The semantic prompts 70 may include a question presented as synthesized speech. Additionally, or alternatively, the semantic prompts 70 may include a question presented in text form. The semantic prompts 70 may seek information about the technical issue and/or seek information about a change occurring after the alteration of the physical structure of the object of interest 10.

In another embodiment, the artificial-intelligence-based technical support operations may involve using the aggregated analysis of the first audio signals and the first image signals to select a first semantic prompt from the at least one data structure. The first semantic prompt may seek information about the technical issue for which support is sought. In a general sense, selecting the first semantic prompt from the at least one data structure using the aggregated analysis of the first audio signals and the first image signals to select a first semantic prompt may occur in a manner similar to the selecting of an image capture instruction using the aggregated analysis of the first audio signals and the first image signals previously discussed.

In the artificial-intelligence-based technical support session 200 illustrated in FIGS. 10-11, the TSC 60 may be configured to use the aggregated analysis of the first audio signals 35$s$1' and/or the first image signals 33$s$1' to select a first semantic prompt 71$a$ from the at least one data structure 90, at Step 252. The aggregated information from the first audio signals 35$s$1' and the first image signals 33$s$1' may enable the TSC 60 to select the most relevant information or guidance to convey back to the user 20 as the first semantic prompt 71$a$. The first semantic prompt 71$a$ may seek information from the user 20 about the technical issue for which support is sought during the artificial-intelligence-based technical support session 200. For example, the first semantic prompt 71$a$ may be a prompt for a response from the user 20 related to the best working solution of the object at interest 10 which may indicate what the user 20 is to do next in the artificial-intelligence-based technical support session 200.

In another embodiment, the artificial-intelligence-based technical support operations may involve presenting the first semantic prompt to the mobile communications device via the at least one network. In a general sense, presenting the first semantic prompt may occur in a manner similar to presenting the image capture instruction previously discussed. In the artificial-intelligence-based technical support session 200 illustrated in FIGS. 10-11, after the first semantic prompt 71$a$ is selected from the at least one data structure 90, the TSC 60 may be configured to present the first semantic prompt 71$a$ to the mobile communications device 30 via the at least one network 40 at Step 253$a$. As depicted in FIG. 8, a semantic prompt 70, such as the first semantic prompt 71$a$, may be transmitted to the mobile communications device 30 as image data, audio data, and/or text data over at least one network.

In some embodiments, the first semantic prompt 71$a$ illustrated in FIG. 11 may relate to a question presented in text form and/or a question presented as synthesized speech. For example, the first semantic prompt 71$a$ may be a question, presented in text form and/or synthesized speech, to the user's mobile communications device 30 with the intention of better understanding the current status of the object at interest (e.g., "When was it last working properly?"; "Have you pressed the reset button?"; "It the top LED light blinking?") and/or some instruction, presented in text form and/or synthesized speech, to the user's mobile communications device 30 to apply to the object at interest before moving on with the artificial-intelligence-based technical support session 200 (e.g., "Please turn on the power button and confirm after you are done"; "Disconnect the Ethernet cable and confirm after you are done").

In another non-limiting example, during the artificial-intelligence-based technical support session 200 illustrated in FIGS. 10-11, the user may communicate to the TSC 60 via first audio signals 35$s$1' received by the TSS 60 at Step 231 that the Internet connection is down and via first image signals 33$s$1' identify the object in interest and relevant functional elements thereof, such as a router front panel. The TSC 60 may be configured to analyze the first image signals 33s1' and to identify the type as a DSL router. Combining with the user verbal statement contained in the first audio signals 35s1' with the first image signals 33s1', the TSC 60 may conclude that the DSL cable is not connected properly to a wall socket. The generated first semantic prompt 71a in this example might be "please verify that you your DSL cable is connected to the phone wall socket and confirm back."

In another embodiment, the artificial-intelligence-based technical support operations may involve receiving from the mobile communications device a first response to the first semantic prompt via the at least one network. In a general sense, receiving from the mobile communications device a first response to the first semantic prompt may occur in a manner similar to receiving the image signals and/or receiving the audio signals previously discussed. At step 254a of the artificial-intelligence-based technical support session 200 illustrated in FIG. 10, the TSC 60 may be configured to receive a first response 72a to the first semantic prompt 71a that is presented by the user 20 at Step 203. In some embodiments, the steps of receiving the first response 72a may be similar to the steps of receiving the first audio signals 35s1' and/or the first image signals 33s1', as disclosed above at Steps 231 and 232, respectively.

In another embodiment, the artificial-intelligence-based technical support operations may involve analyzing the first response to the first semantic prompt. In a general sense, analyzing the first response to the first semantic prompt may occur in a manner similar to analyzing the audio signals and/or the image signals previously discussed. In the artificial-intelligence-based technical support session 200 illustrated in FIGS. 10-11, the TSC 60 may be configured to, upon receiving from the mobile communications device 30 a first response 72a to the first semantic prompt 71a via the at least one network 40 at Step 254a, analyze the first response 72a to the first semantic prompt 71a, at Step 255a. In some embodiments, the step of analyzing the first response 72a may be similar to the steps of analyzing the first audio signals 35s1' and/or the first image signals 33s1', as disclosed above at Steps 241 and 242, respectively.

In another embodiment, the artificial-intelligence-based technical support operations may involve, based on the analysis of the first response, accessing the at least one data structure to identify the image capture instruction. In a general sense, accessing the at least one data structure to identify the image capture instruction based on the analysis of the first response may occur in a manner similar to accessing at least one data structure to identify an image capture instruction based on the aggregated analysis of the first image signals and the first audio signals previously discussed.

In the artificial-intelligence-based technical support session 200 illustrated in FIGS. 10-11, the TSC 60 may be configured to access, based on the analysis of the first response 72a at step 255a, the at least one data structure 90 to identify the image capture instruction 75', at Step 256. At Step 256, the comparison module 89 may compare the analysis of the first response 72a to reference data in the data structure records of the data structure 90 in order to identify and/or generate one or more semantic prompts 70, such as an image capture instruction 75'. The image capture instruction 75' may relate to instruction and/or guidance which may be provided to the remote user 20. In some embodiments, the step of accessing the at least one data structure 90 to identify the image capture instruction 75, at Step 256, may be similar to the steps of accessing the at least one data structure 90 to identify the image capture instruction 75', as disclosed above at Step 150. For example, once the data processing unit 80p determines that analysis of the first response 72a to the first semantic prompt 71a contains a similar response and/or objects, issues, or defects as the reference data of the data structure records, the comparison module 89 of the TSC 60 may access at least one data structure 90 and/or database to identify the image capture instruction 75' to be presented to the user 20.

In another embodiment, the artificial-intelligence-based technical support operations may involve presenting the image capture instruction to the mobile communications device via the at least one network, the image capture instruction including a direction to alter a physical structure identified in the first image signals and to capture second image signals of an altered physical structure. In a general sense, presenting the image capture instruction to the mobile communications device via the at least one network may occur in a manner similar to presenting the image capture instruction to the mobile communications device via the at least one network previously discussed. Additionally, the image capture instruction may be similar to the image capture instruction previously discussed.

In the artificial-intelligence-based technical support session 200 illustrated in FIGS. 10-11, the TSC 60 may be configured to, upon accessing and identifying the proper image capture instruction 75' to be presented to the user 20 at Step 256, present the image capture instruction 75' to the user 20 via the at least one network 40 at Step 260. In some embodiments, the step of presenting the image capture instructions 75' at Step 260 may be similar to the step of presenting the image capture instructions 75', as disclosed above at Step 160.

In another embodiment, the artificial-intelligence-based technical support operations may involve receiving from the mobile communications device second image signals via the at least one network. The second image signals may correspond to the altered physical structure. In a general sense, receiving from the mobile communications device second image signals may occur in a manner similar to receiving from the mobile communications device second image signals previously discussed. In the artificial-intelligence-based technical support session 200 illustrated in FIGS. 10-11, in response to the image capture instructions 75' presented at Step 260, the user may respond to the image capture instructions 75' by presenting second image signals 33s2' corresponding to the input optical signals of the altered object of interest as captured by the image sensor of the mobile communications device 30 at Step 206 which are then received by the TSC 60 at Step 272. In some embodiments, the step of receiving second image signals 33s2' from the mobile communications device 30 at Step 272 may be similar to the step of receiving second image signals 33s2 from the mobile communications device 30 at Step 172

In another embodiment, the artificial-intelligence-based technical support operations may involve analyzing the captured second image signals using artificial intelligence. In a general sense, analyzing the captured second image signals using artificial intelligence may occur in a manner similar to analyzing the captured second image signals using artificial intelligence previously discussed. In the artificial-intelligence-based technical support session 200 illustrated in FIGS. 10-11, the second image signals 33s2' received by the TSC 60 from remote user 20 at Step 272 may be processed and/or analyzed by the control unit 80 of the TSC 60 using, for example, the image processing module 82 of the data processing unit 80p at Step 282. In some embodiments, the receiving of the second image signals 33s2' at Step 272 may be similar to the receiving of the second image signals 33s2' at Step 172, as discussed above. Upon receiving the second image signals 33s2' at Step 272, TSC 60 may be configured to analyze the second image signals 33s2' at Step 282 received from the mobile communications device 30 using artificial intelligence. In some embodiments, the analysis of the second image signals 33s2' using artificial intelligence at Step 282 may be similar to the analysis of the second image signals 33s2' using artificial intelligence, as discussed above at Step 182.

According to another embodiment, the artificial-intelligence-based technical support operations may involve based on the analysis of the second image signals, accessing the at least one data structure containing the plurality of semantic prompts; sing the second image signals to select a second semantic prompt from the at least one data structure; presenting the second semantic prompt to the mobile communications device via the at least one network; receiving from the mobile communications device a second response to the second semantic prompt via the at least one network; analyzing the second response to the second semantic prompt; and based on the analysis of the second response, determining the technical support resolution status.

The following examples are presented with reference to the flow chart depicting an exemplary method for an artificial-intelligence-based technical support session 200 illustrated in FIG. 10 and the simplified functional flow chart schematically depicting the artificial-intelligence-based technical support session 200, in accordance with some embodiments, illustrated in FIG. 11, together with the network diagram of FIG. 1A.

In some embodiments, the artificial-intelligence-based technical support operations may involve accessing the at least one data structure to retrieve from the at least one data structure a second semantic prompt. The second semantic prompt may seek information about a change occurring after the alteration of the physical structure. Accessing the at least one data structure containing the plurality of semantic prompts may be based on the analysis of the second image signals such that the second image signals are used to select a second semantic prompt from the at least one data structure. In a general sense, accessing the at least one data structure to retrieve from the at least one data structure a second semantic prompt may occur in a manner similar to accessing the at least one data structure to identify an image capture instruction and/or accessing at least one data structure containing a plurality of semantic prompts previously discussed. Additionally, using the aggregated analysis of the second audio signals and/or the first image signals to select a second semantic prompt may occur in a manner similar to using the aggregated analysis of the first audio signals and the first image signals to select a first semantic prompt.

In the artificial-intelligence-based technical support session 200 illustrated in FIGS. 10-11, the TSC 60 may be configured to access, at Step 251b, the at least one data structure 90 illustrated in FIG. 8 containing the plurality of semantic prompts 70. Accessing the at least one data structure 90 containing the plurality of semantic prompts 70 at Step 251b may be based on the analysis of the second image signals 33s2' at Step 282 and/or an analysis of the second audio signals 35s2'. In certain embodiments, the comparison module 89 may use the detected problems/defects, or adjustments made to the detected problems/defects, as contained in the second image signals 33s2' and/or the second audio signals 35s2', to determine which past solutions from the data structure 90 may be presented to the user 20 as a second semantic prompt 71b, corresponding to a best working solution. In some embodiments, the steps of accessing the at least one data structure at Step 251b based on the analysis of the second image signals 33s2' and/or the second audio signals 35s2' may be similar to the steps of accessing the at least one data structure at Step 251a based on the analysis of the first audio signals 35s1' and/or the first image signals 33s1', as disclosed above at Steps 241 and 242, respectively, and optionally at Step 243.

In some embodiments, the artificial-intelligence-based technical support operations may involve presenting the second semantic prompt to the mobile communications device via the at least one network. In a general sense, presenting the second semantic prompt may occur in a manner similar to presenting the first semantic prompt previously discussed. In the artificial-intelligence-based technical support session 200 illustrated in FIGS. 10-11, once the second semantic prompt 71b is selected from the at least one data structure 90, the TSC 60 may be configured to present the second semantic prompt 71b to the mobile communications device 30 via the at least one network 40 at Step 253b.

In some embodiments, the artificial-intelligence-based technical support operations may involve receiving from the mobile communications device a second response to the second semantic prompt via the at least one network. In a general sense, receiving from the mobile communications device a second response to the second semantic prompt may occur in a manner similar to receiving the first response to the first semantic prompt previously discussed. At step 254b of the artificial-intelligence-based technical support session 200 illustrated in FIG. 10, the TSC 60 may be configured to receive a second response 72b to the second semantic prompt 71b that is presented by the user's mobile communications device 30 at Step 207. In some embodiments, the steps of receiving the second response 72b to the second semantic prompt 71b may be similar to the steps of receiving the first response 72a to the first semantic prompt 71a, as disclosed above at Step 254a.

In another embodiment, the artificial-intelligence-based technical support operations may involve analyzing the second response to the second semantic prompt. In a general sense, analyzing the second response to the second semantic prompt may occur in a manner similar to analyzing the analyzing the first response to the first semantic prompt previously discussed. In the artificial-intelligence-based technical support session 200 illustrated in FIGS. 10-11, the TSC 60 may be configured to, upon receiving from the mobile communications device 30 a second response 72b to the second semantic prompt 71b via the at least one network 40 at Step 254a, analyze the second response 72b to the second semantic prompt 71b, at Step 255b. In some embodiments, the steps of analyzing the second response 72b to the second semantic prompt 71b may occur in a manner similar to the step of analyzing the first response 72a to the first semantic prompt 71a, as disclosed above at Step 255a.

In another embodiment, the artificial-intelligence-based technical support operations may involve, based on the analysis of the second response, determining a technical support resolution status. In a general sense, determining a technical support resolution status based on the analysis of the second response may occur in a manner similar to determining a technical support resolution status based on the analysis of the second image signals previously discussed.

In the artificial-intelligence-based technical support session 200 illustrated in FIGS. 10-11, the TSC 60 may be configured and operable to, after analyzing the second response 72b to the second semantic prompt 71b at Step 255b, determine a technical support resolution status 79' at Step 290. In some embodiments, the step of determining a technical support resolution status 79' at Step 290 may be similar to the step of determining a technical support resolution status 79' as disclosed above at Step 190. Additionally, at Step 290, the comparison module 89 illustrated in FIG. 8 may access the at least one data structure 90 in order to determine whether the second response 72b to the second semantic prompt 71b contains similar resolution indications as the reference data of the data structure records or whether the second response 72b to the second semantic prompt 71b contains information indicating that additional support is required. In the event that the second response 72b includes information indicating that additional support is required, certain operations of the artificial-intelligence-based technical support session 200 may be conducted iteratively in real time until the user's problem is resolved. Thus, the comparison module 89 may be configured and operable to analyze the information contained in the second response 72b to the second semantic prompt 71b and/or the altering actions identified in the second image signals 33s2' relating to a modification, adjustment, repair, and/or any other action taken by the user 20 with respect to the object of interest 10, or a functional element 14 thereof, to determine the technical support resolution status 79'.

Accordingly, the systems, methods, and non-transitory computer readable medium capable of performing artificial-intelligence-based technical support operations disclosed herein may enable a user to proactively diagnose faulty item/equipment for increasing productivity and efficiency, and to resolve issues faster based on a maintained pool of past working solutions. The user's mobile communications device is thereby harnessed to conduct technical support sessions and improve customer satisfaction, decrease technician dispatch rates for resolving user's problems, substantially improve the support session resolution rates, and decrease the average handling time, as well as address numerous other challenges related to traditional customers support models, including increasingly complex customer needs, communication gaps, diagnosis challenges, limited problem solving rates, and customer dissatisfaction and frustration.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "unit," "circuit," "module" or "system." Furthermore, aspects of the present disclosure may take the form of a computer program product embodied in one or more computer readable medium(s) having computer readable program code embodied thereon.

As described hereinabove and shown in the associated figures, the present disclosure provides support session techniques, systems, and methods, for expeditiously identifying product defects/other issues and corresponding working solutions for resolving problems encountered by remote users. While particular embodiments of the disclosure have been described, it will be understood, however, that the disclosure is not limited thereto, since modifications may be made by those skilled in the art, particularly in light of the foregoing teachings. As will be appreciated by the skilled person, the disclosure can be carried out in a great variety of ways, employing more than one technique from those described above, all without exceeding the scope of the claims.

The foregoing description has been presented for purposes of illustration. It is not exhaustive and is not limited to the precise forms or embodiments disclosed herein. Modifications and adaptations will be apparent to those skilled in the art from consideration of the specification and practice of the disclosed embodiments. Although certain aspects of the disclosed embodiments are described as being stored in databases or data structures, one skilled in the art will appreciate that these aspects can also be stored on other types of computer readable media, such as secondary storage devices, e.g., hard disks or CD ROM, or other forms of RAM or ROM, USB media, DVD, Blu-ray, Ultra HD Blu-ray, or any other optical drive media.

Computer programs based on the written description and disclosed methods are within the skills of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets. Additionally, it is to be understood that the technology disclosed herein may be implemented by software which may be integrated into existing computer readable medium systems of technical support centers and/or organizations and which may replace said software or work in parallel thereto.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

The invention claimed is:

1. A non-transitory computer readable medium including instructions that, when executed by at least one processor, cause the at least one processor to perform artificial-intelligence-based technical support operations, the operations comprising:

receiving over at least one network first audio signals from a mobile communications device, the first audio signals including speech data associated with a technical support session;

receiving first image signals from the mobile communications device via the at least one network, the first image signals including image data associated with a product for which support is sought;

analyzing the first audio signals using artificial intelligence;

analyzing the first image signals using artificial intelligence;

aggregating the analysis of the first audio signals and the first image signals;
based on the aggregated analysis of the first image signals and the first audio signals, accessing at least one data structure to identify an image capture instruction;
presenting the image capture instruction to the mobile communications device via the at least one network, the image capture instruction including a direction to alter a physical structure identified in the first image signals and to capture second image signals of an altered physical structure;
receiving from the mobile communications device second image signals via the at least one network, the second image signals corresponding to the altered physical structure;
analyzing the captured second image signals using artificial intelligence; and
based on the analysis of the second image signals, determining a technical support resolution status.

2. The non-transitory computer readable medium of claim 1, wherein the operations further comprise:
based on the aggregated analysis of the first audio signals and the first image signals, accessing the at least one data structure containing a plurality of semantic prompts;
using the aggregated analysis of the first audio signals and the first image signals to select a first semantic prompt from the at least one data structure;
presenting the first semantic prompt to the mobile communications device via the at least one network;
receiving from the mobile communications device a first response to the first semantic prompt via the at least one network;
analyzing the first response to the first semantic prompt; and
based on the analysis of the first response, accessing the at least one data structure to identify the image capture instruction.

3. The non-transitory computer readable medium of claim 2, wherein the first semantic prompt includes a question presented in text form.

4. The non-transitory computer readable medium of claim 2, wherein the first semantic prompt includes a question presented as synthesized speech.

5. The non-transitory computer readable medium of claim 2, wherein the operations further comprise using the analysis of the first audio signals to categorize subject matter of the first image signals.

6. The non-transitory computer readable medium of claim 2, wherein the operations further comprise using the analysis of the first image signals to interpret the first audio signals.

7. The non-transitory computer readable medium of claim 2, wherein:
the first audio signals identify a technical issue;
the first image signals contain images of the product associated with the technical issue; and
the first semantic prompt seeks information about the technical issue.

8. The non-transitory computer readable medium of claim 2, wherein the operations further comprise:
based on the analysis of the second image signals, accessing the at least one data structure containing the plurality of semantic prompts;
using the second image signals to select a second semantic prompt from the at least one data structure;
presenting the second semantic prompt to the mobile communications device via the at least one network;
receiving from the mobile communications device a second response to the second semantic prompt via the at least one network;
analyzing the second response to the second semantic prompt; and
based on the analysis of the second response, determining the technical support resolution status.

9. The non-transitory computer readable medium of claim 8, wherein:
the first audio signals identify a technical issue;
the first image signals contain images of the product associated with the technical issue;
the first semantic prompt seeks information about the technical issue; and
the second semantic prompt seeks information about a change occurring after the alteration of the physical structure.

10. The non-transitory computer readable medium of claim 8, the operations further include:
after presenting the image capture instruction, receiving from the mobile communications device second audio signals via the at least one network, the second audio signals corresponding to a status of the altered physical structure;
analyzing the second audio signals using artificial intelligence;
based on the analysis of the second audio signals, accessing the at least one data structure containing the plurality of semantic prompts; and
using the second audio signals to select the second semantic prompt from the at least one data structure.

11. The non-transitory computer readable medium of claim 1, wherein analyzing the first audio signals, analyzing the first image signals, and aggregating occur in a singular process.

12. The non-transitory computer readable medium of claim 1, wherein the operations further comprise using the analysis of the first audio signals to categorize subject matter of the first image signals.

13. The non-transitory computer readable medium of claim 1, wherein the operations further comprise using the analysis of the first image signals to interpret the first audio signals.

14. The non-transitory computer readable medium of claim 1, wherein the operations are performed in an automated fashion without human intervention.

15. The non-transitory computer readable medium of claim 1, wherein the non-transitory computer readable medium is further configured to simultaneously engage in a plurality of support sessions, the plurality of support sessions including the support session with the mobile communications device and support sessions with a plurality of additional mobile communications devices.

16. The non-transitory computer readable medium of claim 1, wherein:
the technical support resolution status includes an indication that a technical support issue is resolved; and
the operations further include terminating the technical support session.

17. The non-transitory computer readable medium of claim 1, wherein:
the technical support resolution status includes an indication that a technical support issue is not resolved; and
the operations further include linking the mobile communications device to a human agent for further assistance.

18. The non-transitory computer readable medium of claim 1, wherein:
the technical support resolution status includes an indication that a technical support issue is not resolved; and
the operations further include:
sending a prompt to the mobile communications device seeking additional audio signals and additional image signals,
analyzing following receipt and in an aggregated fashion, the additional audio signals and the additional image signals,
performing an additional lookup in the at least one data structure to determine an associated remedial measure, and
presenting the remedial measure to the mobile communications device.

19. The non-transitory computer readable medium of claim 1, wherein the first image signal analysis and the second image signal analysis include pixel analytics.

20. The non-transitory computer readable medium of claim 1, wherein the first audio signal analysis includes natural language processing techniques.

21. The non-transitory computer readable medium of claim 1, the operations further include:
after presenting the image capture instruction, receiving from the mobile communications device second audio signals via the at least one network, the second audio signals corresponding to a status of the altered physical structure;
analyzing the second audio signals using artificial intelligence;
based on the analysis of the second audio signals, accessing the at least one data structure containing the plurality of semantic prompts;
using the second audio signals to select a second semantic prompt from the at least one data structure;
presenting the second semantic prompt to the mobile communications device via the at least one network;
receiving from the mobile communications device a second response to the second semantic prompt via the at least one network;
analyzing the second response to the second semantic prompt; and
based on the analysis of the second response, determining the technical support resolution status.

22. A method of performing artificial-intelligence-based technical support operations, the method comprising:
receiving over at least one network first audio signals from a mobile communications device, the first audio signals including speech data associated with a technical support session;
receiving first image signals from the mobile communications device via the at least one network, the first image signals including image data associated with a product for which support is sought;
analyzing the first audio signals using artificial intelligence;
analyzing the first image signals using artificial intelligence;
aggregating the analysis of the first audio signals and the first image signals;
initially accessing at least one data structure containing a plurality of semantic prompts;
using the aggregated analysis of the first audio signals and the first image signals to select a first semantic prompt from the at least one data structure;
presenting the first semantic prompt to the mobile communications device via the at least one network;
receiving from the mobile communications device a first response to the first semantic prompt via the at least one network;
analyzing the first response to the first semantic prompt;
based on the analysis of the first response, accessing the at least one data structure to identify an image capture instruction;
presenting the image capture instruction to the mobile communications device via the at least one network, the image capture instruction including a direction to alter a physical structure identified in the first image signals and to capture second image signals of an altered physical structure;
receiving from the mobile communications device second image signals via the at least one network, the second image signals corresponding to the altered physical structure;
analyzing the captured second image signals using artificial intelligence;
subsequently accessing the at least one data structure to retrieve from the at least one data structure a second semantic prompt;
presenting the second semantic prompt to the mobile communications device via the at least one network;
receiving from the mobile communications device a second response to the second semantic prompt via the at least one network;
analyzing the second response to the second semantic prompt; and
based on the analysis of the second response, determining a technical support resolution status.

23. The method of claim 22, further comprising using the analysis of the first audio signals to categorize subject matter of the first image signals.

24. The method of claim 22, further comprising using the analysis of the first image signals to interpret the first audio signals.

25. The method of claim 22, wherein the method is performed in an automated fashion without human intervention.

26. The method of claim 22, wherein the first image signal analysis and the second image signal analysis include pixel analytics.

27. The method of claim 22, wherein the first audio signal analysis includes natural language processing techniques.

* * * * *